United States Patent
Shore et al.

(10) Patent No.: US 11,949,081 B2
(45) Date of Patent: Apr. 2, 2024

(54) THERMALLY-CONDUCTIVE STRUCTURAL ADHESIVE FOR NEW ENERGY POWER BATTERY AND METHOD OF PREPARING SAME

(71) Applicants: Shenzhen Goldlink Tongda Electronics Co., Ltd., Shenzhen (CN); Dongguan Goldlink Tongda Thermal Conductive Materials MFG Co., Ltd., Dongguan (CN)

(72) Inventors: Yorway Shore, Shenzhen (CN); Youyu Tan, Shenzhen (CN)

(73) Assignees: Shenzhen Goldlink Tongda Electronics Co., Ltd., Shenzhen (CN); Dongguan Goldlink Tongda Thermal Conductive Materials MFG Co., Ltd., Dongguan (CN)

( * ) Notice: Subject to any disclaimer, the term of this patent is extended or adjusted under 35 U.S.C. 154(b) by 0 days.

(21) Appl. No.: 17/864,309

(22) Filed: Jul. 13, 2022

(65) Prior Publication Data

US 2022/0393264 A1    Dec. 8, 2022

Related U.S. Application Data

(63) Continuation of application No. PCT/CN2022/088056, filed on Apr. 21, 2022.

(30) Foreign Application Priority Data

Jun. 29, 2021 (CN) .......................... 202110765837.5

(51) Int. Cl.
| | | |
|---|---|---|
| *H01M 10/653* | (2014.01) | |
| *C08L 23/12* | (2006.01) | |
| *C08L 23/22* | (2006.01) | |
| *C08L 63/10* | (2006.01) | |
| *C08L 75/04* | (2006.01) | |
| *C08L 83/10* | (2006.01) | |

(52) U.S. Cl.
CPC .......... *H01M 10/653* (2015.04); *C08L 23/12* (2013.01); *C08L 23/22* (2013.01); *C08L 63/10* (2013.01); *C08L 75/04* (2013.01); *C08L 83/10* (2013.01); *C08L 2203/206* (2013.01); *C08L 2205/035* (2013.01)

(58) Field of Classification Search
CPC .......... C08L 23/12; C08L 23/22; C08L 63/10; C08L 75/04; C08L 83/10; C08L 2203/206; C08L 2205/035; C08L 33/14; C08G 18/00; C08G 77/00; C08G 77/42; C08G 81/00; C09J 11/02; C09J 11/04; C09J 9/02; C09J 175/00; C09J 187/00; C09J 183/00; C08K 13/00; H01M 10/653
See application file for complete search history.

(56) References Cited

U.S. PATENT DOCUMENTS 5,910,542 A    6/1999 St. Clair et al.

FOREIGN PATENT DOCUMENTS

| CA | 2202279 A1 | | 4/1996 | |
|---|---|---|---|---|
| CN | 1160416 A | | 9/1997 | |
| CN | 109880571 A | * | 6/2019 | ............ C09J 175/04 |
| CN | 113461901 A | | 10/2021 | |
| CN | 113480968 A | * | 10/2021 | ............ C09J 175/14 |
| CN | 113528056 A | | 10/2021 | |

OTHER PUBLICATIONS

English Machine translation CN 113461901 A to Xiao, Yang-hua; published Oct. 1, 2021 (Year: 2021).*
English Machine translation CN 113528056 A to Hu, Li-ming et al.; published Oct. 22, 2021 (Year: 2021).*
English Machine translation CN 109880571 A to Xiao, Yang-hua, et al. ; published Jun. 14, 2019 (Year: 2019).*
English Machine translation CN 113480968 A to Chen, W, et al.; published Oct. 8, 2021 (Year: 2021).*

* cited by examiner

*Primary Examiner* — Jane L Stanley

(57) ABSTRACT

A thermally-conductive structural adhesive for new energy power batteries, including: composition A including 3.3-14 wt. % of a block polymerized telechelic carboxyl compound and/or a block polymerized telechelic amino compound; 0.1-1.0 wt. % of a coupling agent and/or a modifier; 0-1.6 wt. % of curing accelerator; 84-92 wt. % of a thermally-conductive powder; and 0.3-3.0 wt. % of a flame retardant agent; and composition B including 3.3-14 wt. % of a block polymerized telechelic isocyanate compound and/or a block polymerized telechelic epoxy compound; 0-1.0 wt. % of a coupling agent and/or a modifier; 0-1.6 wt. % of a curing accelerator; 84-92 wt. % of a thermally-conductive powder; and 0.3-3 wt. % of a flame retardant agent. The composition A and the composition B are mixed evenly in a weight or volume ratio of 1:(0.25-2) and cured to obtain the thermally-conductive structural adhesive. A preparation of the thermally-conductive structural adhesive is also provided.

9 Claims, 1 Drawing Sheet

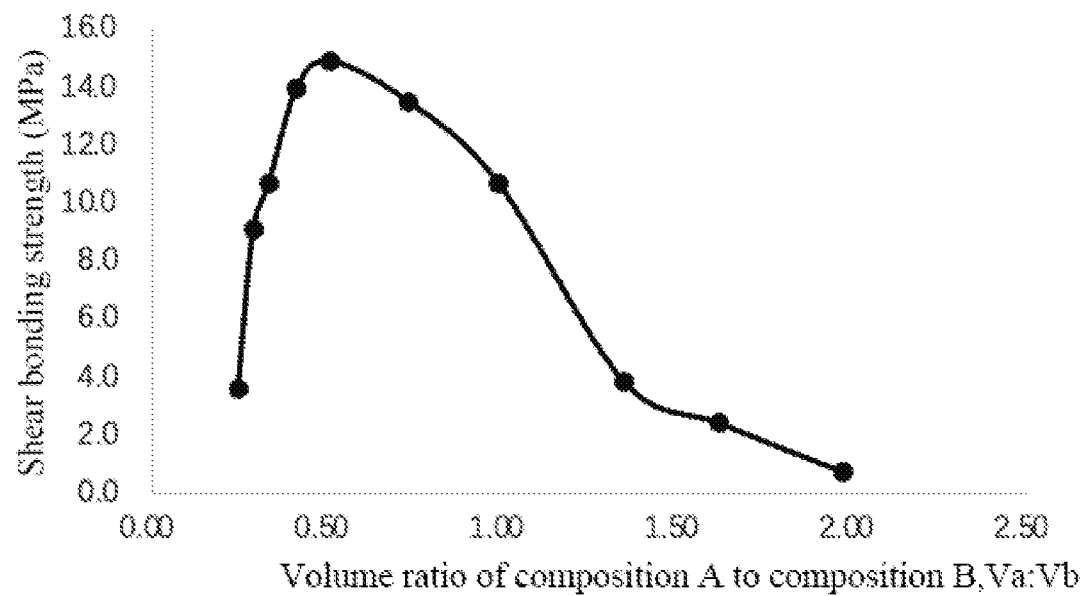

THERMALLY-CONDUCTIVE STRUCTURAL ADHESIVE FOR NEW ENERGY POWER BATTERY AND METHOD OF PREPARING SAME

CROSS-REFERENCE TO RELATED APPLICATIONS

This application is a continuation of International Patent Application No. PCT/CN2022/088056, filed on Apr. 21, 2022, which claims the benefit of priority from Chinese Patent Application No. 202110765837.5, filed on Jun. 29, 2021. The content of the aforementioned application, including any intervening amendments thereto, is incorporated herein by reference in its entirety.

TECHNICAL FIELD

This application relates to design and manufacture of an intersection of polymer-based composite materials, high-strength bonding materials and thermally-conductive functional materials, and more specifically to a thermally-conductive structural adhesive for new energy power batteries and a method of preparing the same.

BACKGROUND

With the accelerated development of new energy vehicle technology, higher and higher requirements are raised for the energy density and battery capacity of the power battery. The power battery module suffers serious heat generation during operation, and the long-term high temperature will weaken the range of the new energy vehicle, shorten the service life of the power battery, and even cause safety accidents.

At present, all new energy vehicle power battery modules are equipped with an active water-cooling system, and the heat-conductive connection between the power battery module and the water-cooling system is achieved by using a thermally-conductive interface material.

As the weakest and most unstable part of a battery system, the battery cell is closely associated with the safety, reliability and environmental adaptability of the battery system, and for a qualified battery pack, the cell temperature difference should be controlled within ±5° C. (Zhang Jianbo, Lu Languang & Li Zhe. Key technologies and subject frontiers of automotive power battery systems [J]. Journal of Automotive Safety and Energy, 2012, 3(2):87-104). Both the General Motors Company and the Tesla, Inc. are striving to control the cell temperature difference to be within ±2° C. In order to ensure the temperature stability between the cells, some car companies use a serpentine thermally-conductive silicone sheets as a heat transfer medium between the cells. The cell shell and the thermally-conductive silicone sheet cannot be in complete contact, causing a low heat transfer rate. In order to improve the heat transfer efficiency, the thermally-conductive interface material is required to have excellent flowability for easy potting before forming.

Chinese Patent Application No. 202010452609.8, titled "A thermal conductive structural adhesive applied to new energy vehicle power battery packs", discloses a two-component thermally-conductive silicone used in new energy vehicle power battery packs. Compared with the traditional thermally-conductive silicone sheet, the two-component thermally-conductive silicone can meet the needs of automated assembly of new energy vehicle power batteries and power battery modules, improving the heat transfer efficiency between cells. For assembled battery modules, bolts and other fastening components are also required. Considering the limitation of the volume, weight and structure of the power battery pack, an effective way to exceed the current expected range is to develop cell to pack (CTP) technology. In the absence of these fastening components, the battery pack structure will be significantly simplified. Therefore, it is urgently needed to design and develop a safe and reliable thermal conductive structural adhesive system, which can directly bond cells into a battery pack to improve the volume utilization rate by (15-20)%, reduce the number of parts by about 40%, and increase the production efficiency by nearly 50%, significantly enhancing the reliability, safety and environmental adaptability of the power battery packs, boosting the energy density of the battery module and greatly reducing the manufacturing cost.

Chinese Patent Application No. 201911307211.9, titled "A thermally-conductive structural adhesive and a preparation method thereof", discloses a two-component thermally-conductive structural adhesive prepared by modifying a thermally-conductive base material, and its bonding strength between metals is (4-6.5) MPa, and its bulk tensile strength is (2-5.5) MPa.

Based on the requirements of "12 m free fall, 45° inclined impact, no short-circuit combustion" or 25G deceleration impact for the car battery pack, the Design Failure Mode and Effects Analysis (DFEAM) shows that in order to enable the 25-year service life (in-service life and out-of-service energy storage life), the thermally-conductive structural adhesive is required to have a shear bonding strength of greater than or equal to 8 MPa, and a tensile strength of greater than or equal to 13 MPa. Obviously, due to the low shear bonding strength and poor tensile strength, the above patented thermally-conductive silicone adhesive and thermally-conductive polyurethane adhesive cannot achieve the goal of replacing the fastening components.

Though a pure epoxy resin-based thermal-conductive structural adhesive has high enough shear bonding strength and tensile strength, the bonding surface is prone to fracture failure after the long-term impact exposure since the epoxy resin has high brittleness.

Therefore, it is necessary to develop a thermally-conductive structural adhesive with the shear bonding strength greater than or equal to 8 MPa, the tensile strength greater than or equal to 13 MPa and the breaking elongation greater than or equal to 20% and easy potting.

SUMMARY

An object of the present disclosure is to provide a thermally-conductive structural adhesive for new energy power batteries and a method of preparing the same, where the thermally-conductive structural adhesive has good insulation and easy potting, and has a shear bonding strength greater than or equal to 8 MPa, a tensile strength greater than or equal to 13 MPa and a breaking elongation greater than or equal to 20%.

The technical solutions of the present disclosure are described as follows.

In a first aspect, this application provides a thermally-conductive structural adhesive for new energy power batteries, comprising:

a composition A comprising 3.3-14% by weight of a block polymerized telechelic carboxyl compound, a block polymerized telechelic amino compound or a combination thereof;

0.1-1.0% by weight of a first coupling agent, a first modifier or a combination thereof;

0-1.6% by weight of a first curing accelerator;

84-92% by weight of a first thermally-conductive powder; and 0.3-3.0% by weight of a first flame retardant agent; and a composition B comprising 3.3-14% by weight of a block polymerized telechelic isocyanate compound, a block polymerized telechelic epoxy compound or a combination thereof;

0-1.0% by weight of a second coupling agent, a second modifier or a combination thereof;

0-1.6% by weight of a second curing accelerator;

84-92% by weight of a second thermally-conductive powder; and 0.3-3% by weight of a second flame retardant agent;

wherein a weight or volume ratio of the composition A to the composition B is 1:(0.25-2);

the composition A and the composition B are mixed evenly and cured to obtain the thermally-conductive structural adhesive.

In a second aspect, this application provides a method for preparing a thermally-conductive structural adhesive for new energy power batteries, comprising:

(1) subjecting a telechelic carboxyl compound, a telechelic amino compound or a combination thereof to block polymerization to obtain a first block polymerized product, and subjecting a telechelic isocyanate compound, a telechelic epoxy compound or a combination thereof to block polymerization to obtain a second block polymerized product; wherein during the block polymerization, an orientation of "head-to-head" or "head-to-tail" connection of molecular chains is random, and an atomic arrangement orientation of a cis or trans molecular segment is random;

(2) subjecting the first block polymerized product to powder modification with a first powder mixture under controlled shear strength to obtain a composition A; and subjecting the second block polymerized product to powder modification with a second powder mixture under controlled shear strength to obtain a composition B;

(3) controlling a positive or negative pressure reaction; and (4) performing heating and cooling;

wherein at least two of the steps (1)-(4) are combined or steps (1) and (2) are combined.

In an embodiment, the block polymerized telechelic carboxyl compound is selected from the group consisting of telechelic carboxyl polybutadiene of formula (1), a product formed by reaction of isocyanate and the telechelic carboxyl polybutadiene according to formula (2) and removal of carbon dioxide, a product formed by reaction of epoxy resin and the telechelic carboxyl polybutadiene according to formula (3), a product formed by reaction of epoxy polyalkylsiloxane and the telechelic carboxyl polybutadiene according to formula (4) and a combination thereof;

wherein the formula (1) is expressed as:

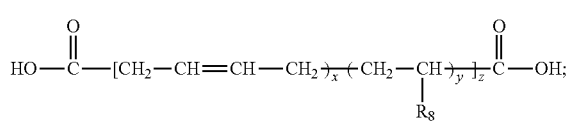

wherein in the formula (1), x=1, and y is a mole ratio relative to x, and selected from 0-1.0; z represents number-average degree of polymerization, and is selected from 9-27, and a number-average functionality of a carboxyl group is 2.1-2.2; and $R_8$ is a vinyl or a cyano group;

the formula (2) is expressed as:

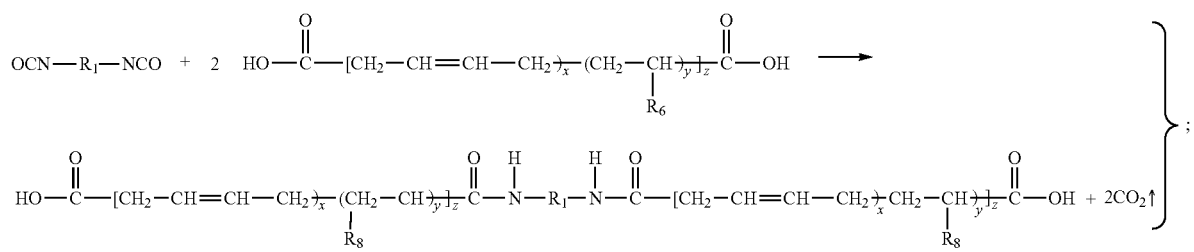

wherein in the formula (2), a number-average functionality of an isocyanate group in isocyanate $OGN-R_1-NCO$ is 2.0; and $R_1$ is selected from the group consisting of alkylene, unsubstituted phenylene, substituted phenylene, unsubstituted arylene, substituted arylene, unsubstituted heterocyclic alkene, substituted heterocyclic alkene and a combination thereof, wherein alkene is a group formed after a carbon-hydrogen bond in an organic compound is homolytically cleaved to remove two hydrogen atoms;

the formula (3) is expressed as:
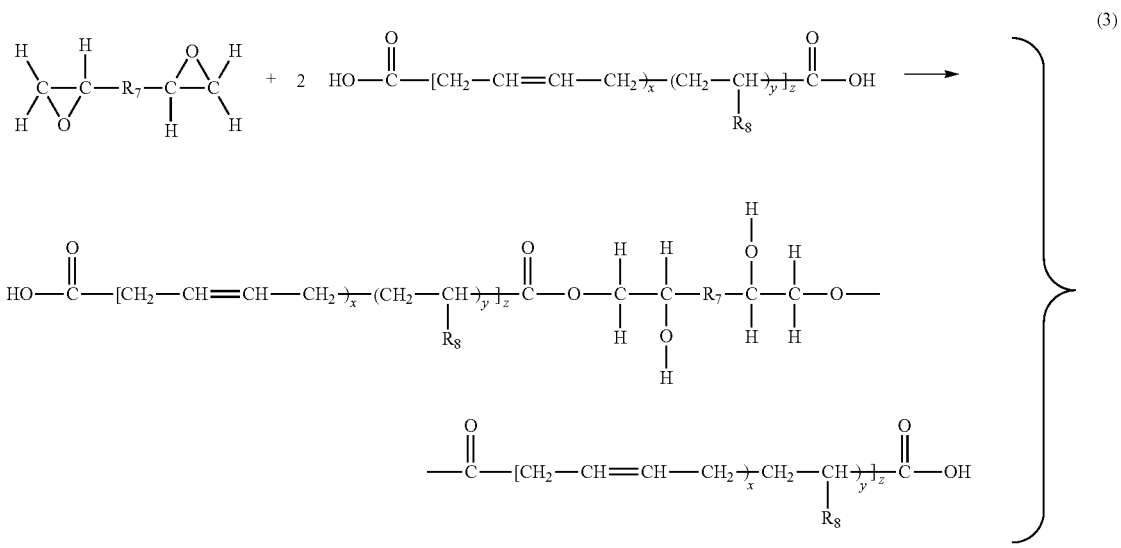
(3)
wherein in the formula (3), an epoxy compound meets a definition of formula (17);
the formula (4) is expressed as:

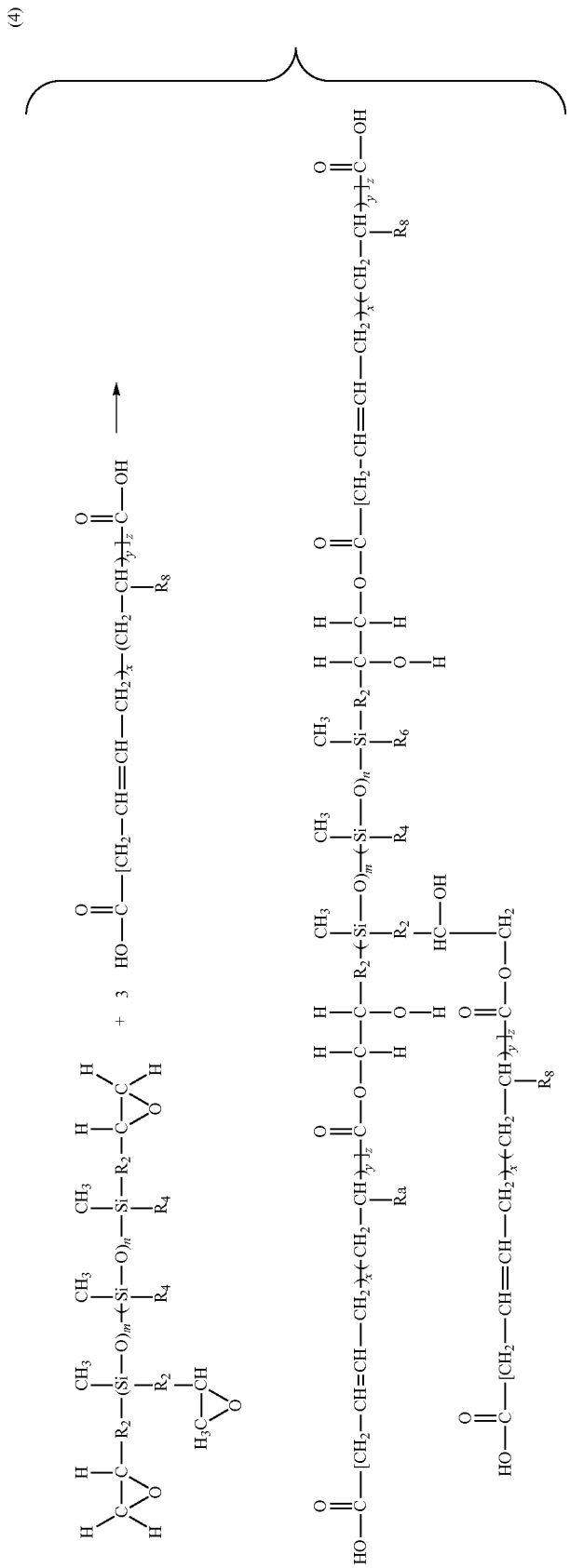

wherein in the formula (4), an epoxy compound meets a definition of formula (21).

In an embodiment, the block polymerized telechelic amino compound is selected from the group consisting of a telechelic amino polypropylene oxide of formula (5), an aminopolyalkylsiloxane of formula (6), a product formed by reaction of isocyanate and the telechelic amino polypropylene oxide according to formula (7), a product formed by reaction of isocyanate and the aminopolyalkylsiloxane according to formula (8), a reaction product formed by reaction of an epoxy resin and the telechelic amino polypropylene oxide according to formula (9), a product formed by reaction of the epoxy resin and the aminopolyalkylsiloxane according to formula (10), a product formed by reaction of epoxy polyalkylsiloxane and the telechelic amino polypropylene oxide according to formula (11), a product formed by reaction of the epoxy polyalkylsiloxane and the aminopolyalkylsiloxane according to formula (12);

the formula (5) is expressed as:

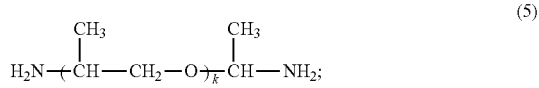

(5)

wherein in the formula (5), k represents a number-average degree of polymerization, and is selected from 25-50; and a number-average functionality of an amino group is 2.0-2.3;

the formula (6) is expressed as:

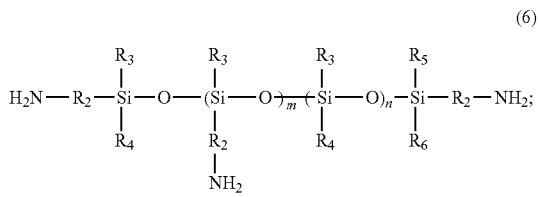

(6)

wherein in the formula (6), number-average degree of polymerization m is 0-1, and number-average degree of polymerization n is 8-22; a number-average functionality of an amino group is 2.9-3.3; $R_2$ is a $C_2$-$C_5$ alkylene; and $R_3$, $R_4$, $R_5$ and $R_6$ are independently selected from the group consisting of alkyl, unsubstituted phenyl, substituted phenyl, unsubstituted aryl, substituted aryl, unsubstituted heterocyclic group, substituted heterocyclic group and a combination thereof;

the formula (7) is expressed as:

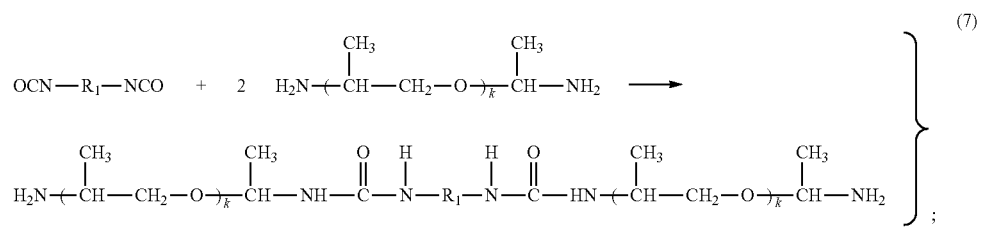

(7)

the formula (8) is expressed as:

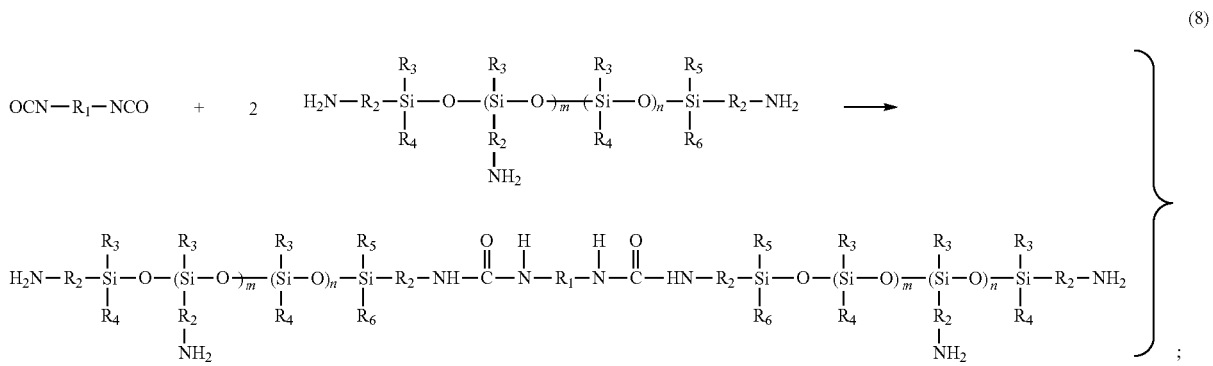

(8)

the formula (9) is expressed as:
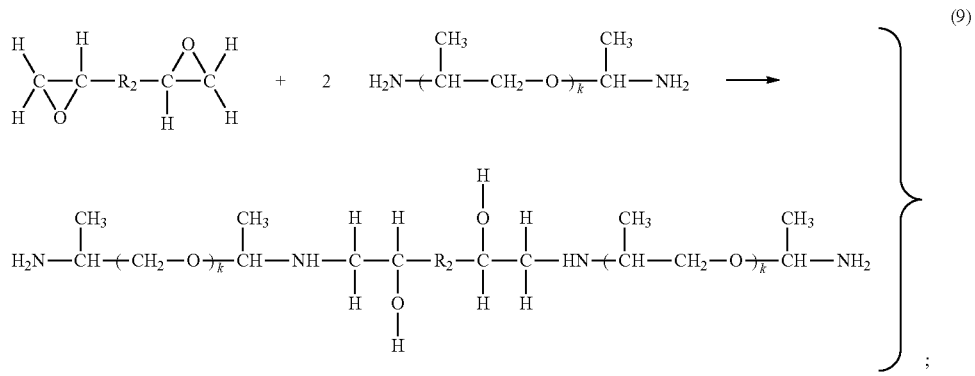
(9)
the formula (10) is expressed as:
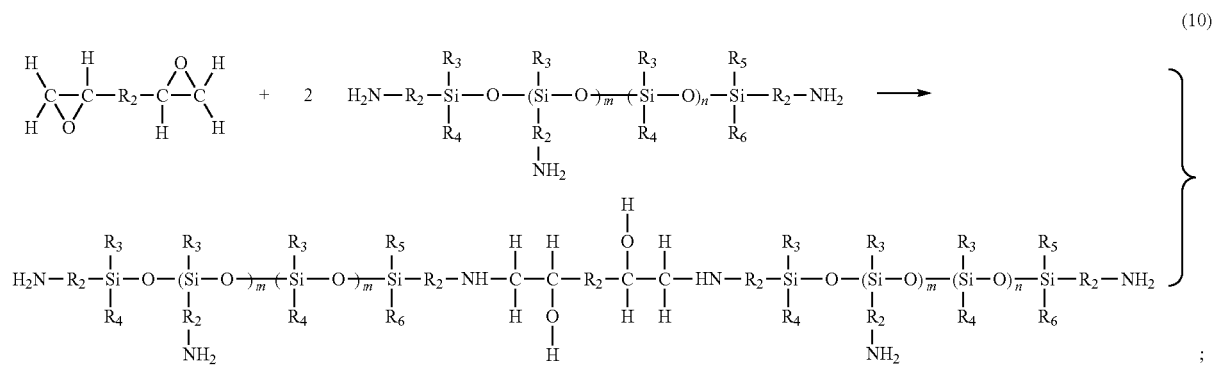
(10)
the formula (11) is expressed as:
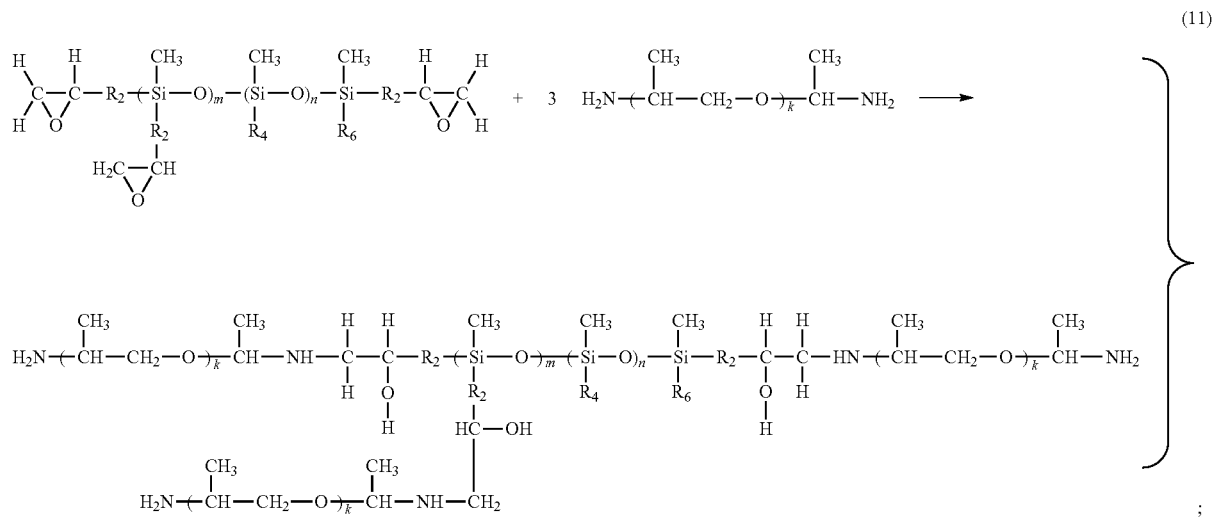
(11)
the formula (12) is expressed as:

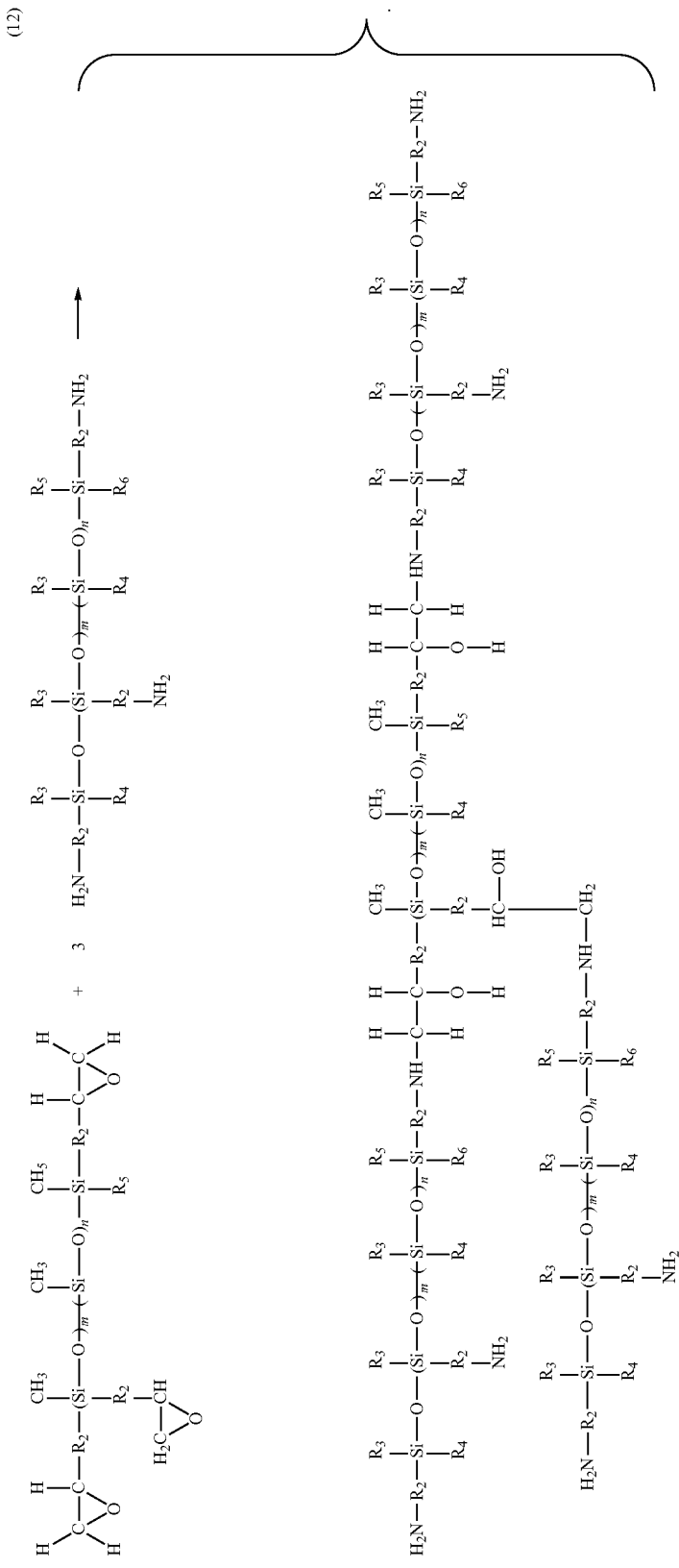

In an embodiment, the block polymerized telechelic isocyanate compound is selected from the group consisting of an isocyanate of formula (13), a product formed by reaction of the isocyanate and a telechelic carboxyl polybutadiene according to formula (14) and removal of carbon dioxide, a product formed by reaction of the isocyanate and telechelic amino polypropylene oxide according to formula (15), a product formed by reaction of the isocyanate and aminopolyalkylsiloxane according to formula (16) and a combination thereof;

the formula (13) is expressed as:

wherein in the formula (13), a number-average functionality of an isocyanate group is 2.0; and $R_1$ is selected from the group consisting of alkylene, unsubstituted phenylene, substituted phenylene, unsubstituted arylene, substituted arylene, unsubstituted heterocyclic alkene, substituted heterocyclic alkene and a combination thereof;

the formula (14) is expressed as:

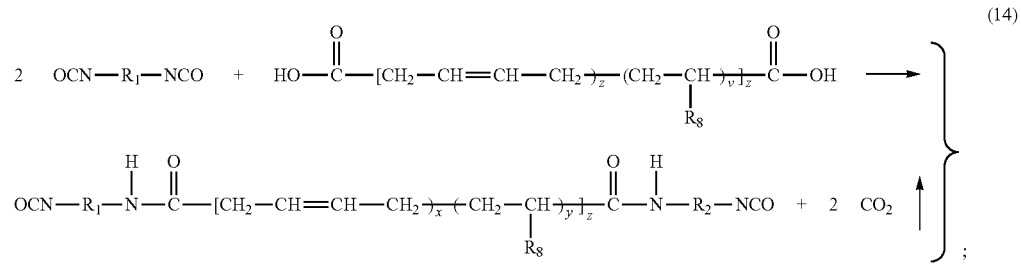

the formula (15) is expressed as:

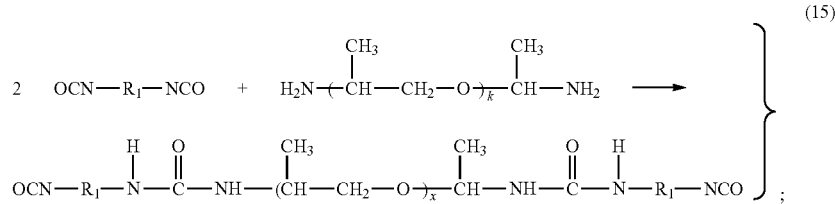

the formula (16) is expressed as:

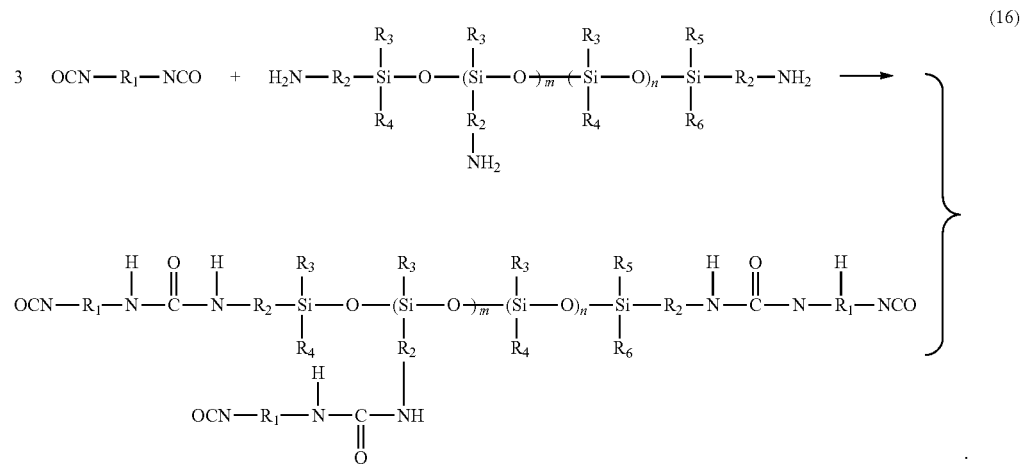

In an embodiment, the block polymerized telechelic epoxy compound is selected from the group consisting of an epoxy resin of formula (17), a product formed by reaction of the epoxy resin and telechelic carboxyl polybutadiene according to formula (18), a product formed by reaction of the epoxy resin and telechelic amino polypropylene oxide according to formula (19), a product formed by reaction of the epoxy resin and aminopolyalkylsiloxane according to formula (20), epoxy polyalkylsiloxane of formula (21), a product formed by reaction of the epoxy polyalkylsiloxane and the telechelic carboxyl polybutadiene according to formula (22), a product formed by reaction of the epoxy polyalkylsiloxane and the telechelic amino polypropylene oxide according to formula (23), a product formed by reaction of the epoxy polyalkylsiloxane and the aminopolyalkylsiloxane according to formula (24) and a combination thereof;

the formula (17) is expressed as:

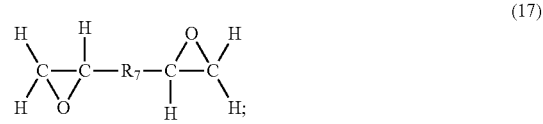

wherein in the formula (17), a number-average functionality of an epoxy group is 2.0 or 3.0; and $R_7$ is selected from the group consisting of a group of formula (25), a group of formula (26), alkylene, unsubstituted phenylene, substituted phenylene, unsubstituted arylene, substituted arylene, unsubstituted heterocyclic alkene, substituted heterocyclic alkene and a combination thereof;

the formula (18) is expressed as:

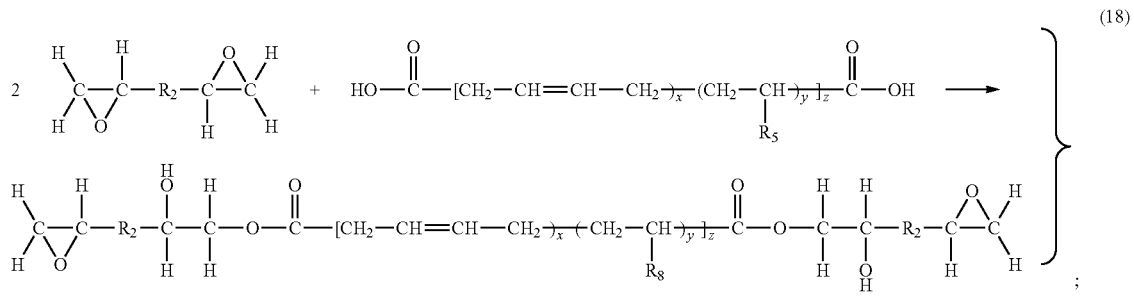

the formula (19) is expressed as:

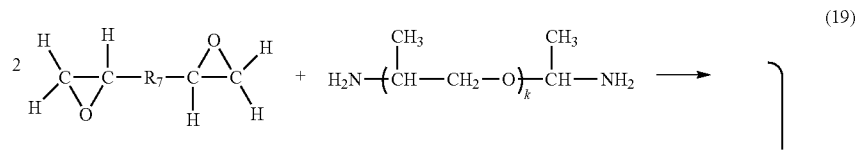

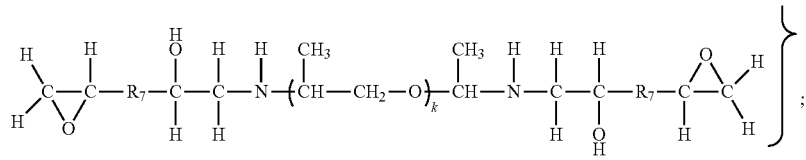

the formula (20) is expressed as:

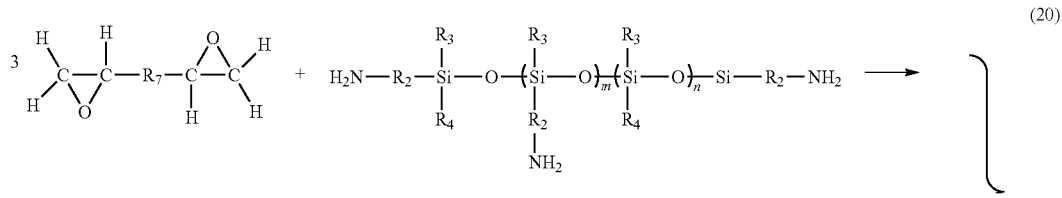

-continued

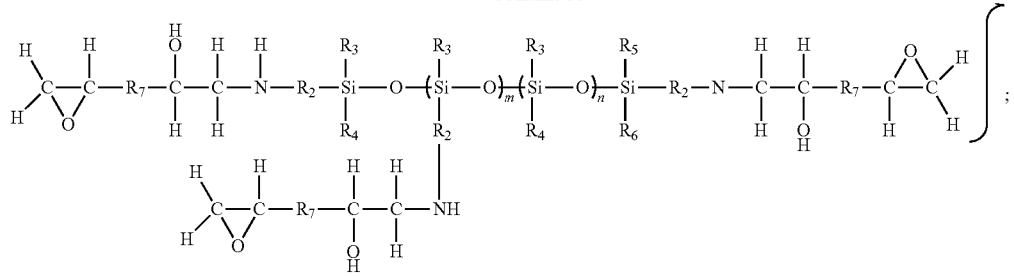

the formula (21) is expressed as:

(21)

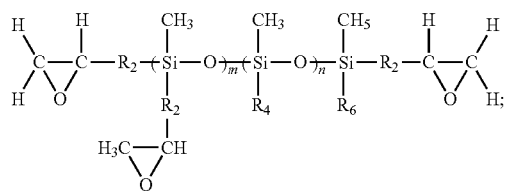

wherein in the formula (21), m and n respectively represent a number-average polymerization degree of alkyl siloxane, m is greater than or equal to 0, and n is 5-50;

a number-average functionality of epoxy group is 2.8-3.0; $R_2$ is a $C_2$-$C_5$ alkylene; and $R_3$, $R_4$, $R_5$ and $R_6$ are independently selected from the group consisting of alkyl, unsubstituted phenyl, substituted phenyl, unsubstituted aryl, substituted aryl, unsubstituted heterocyclic group, substituted heterocyclic group and a combination thereof;

the formula (22) is expressed as:

(22)

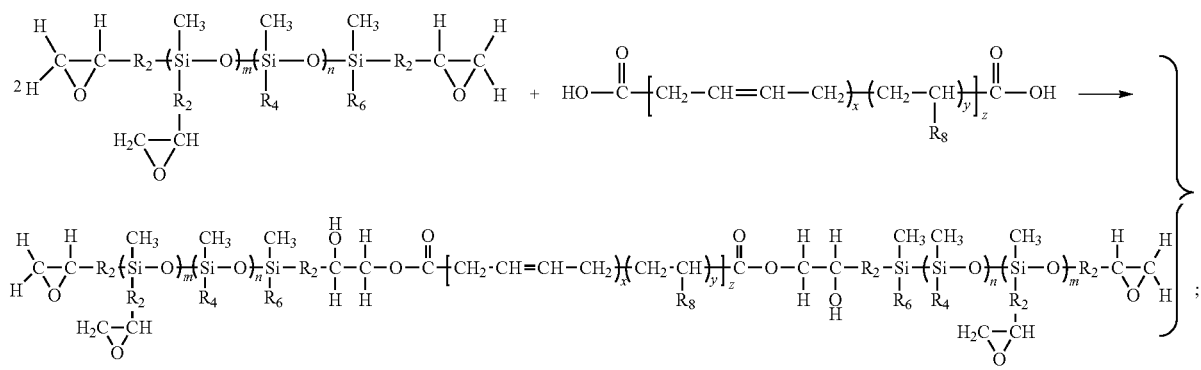

the formula (23) is expressed as:

(23)

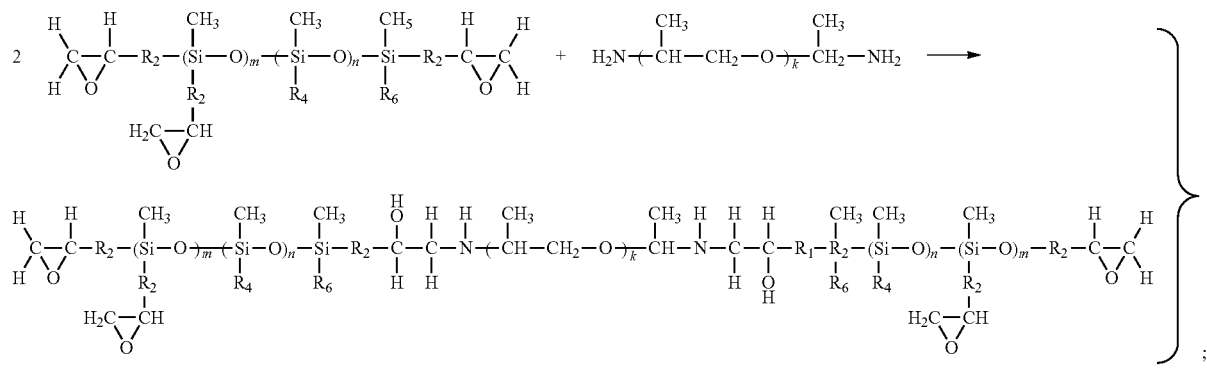

the formula (24) is expressed as:

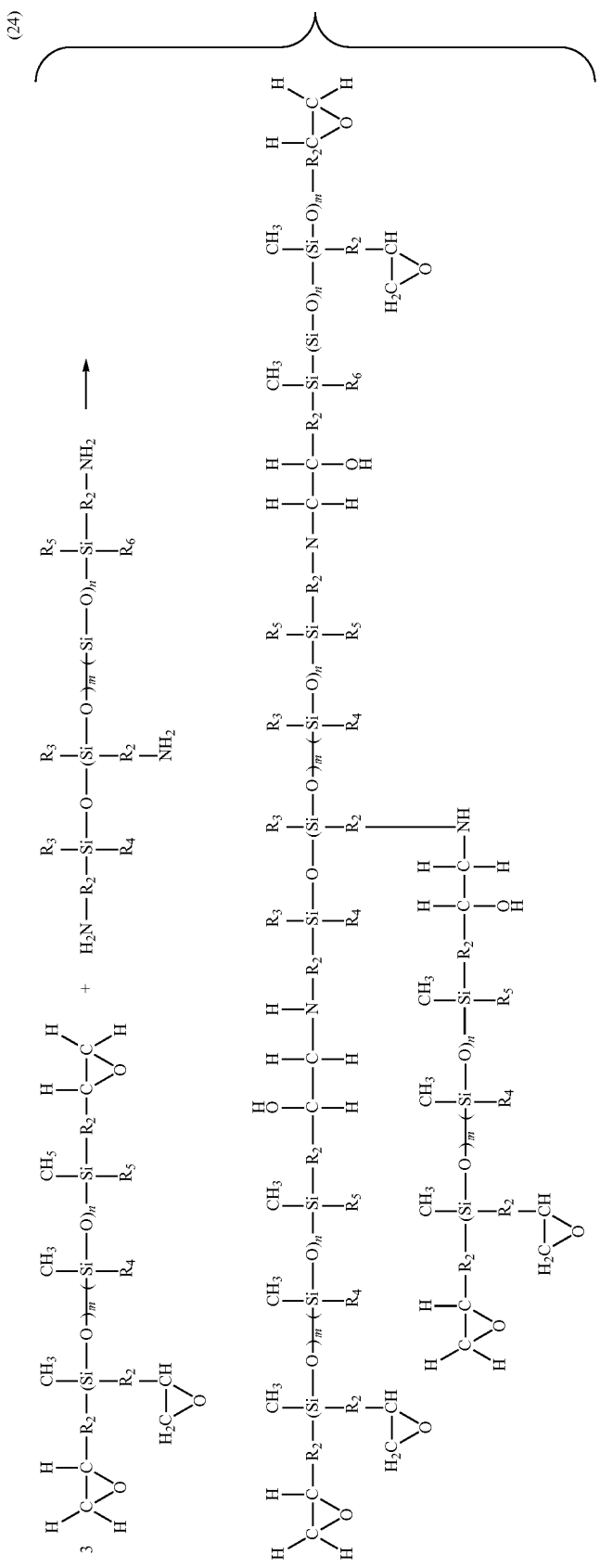

the formula (25) is expressed as:

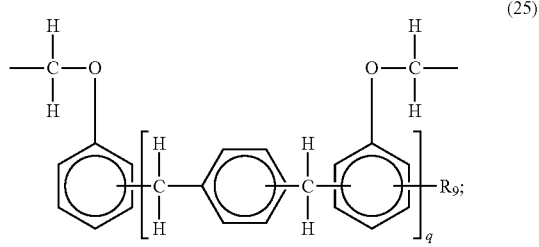

(25)

wherein in the formula (25), a number-average degree of polymerization q is 1-2; a number-average functionality of epoxy group is 2.0 or 3.0; and $R_9$ is selected from the group consisting of hydrogen, $C_1$-$C_5$ alkyl, unsubstituted phenyl, substituted phenyl, unsubstituted aryl, substituted aryl, unsubstituted heterocyclic group, substituted heterocyclic group and a combination thereof;

the formula (26) is expressed as:

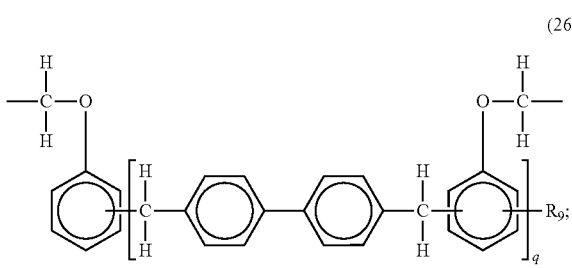

(26)

wherein in the formula (26), a number-average degree of polymerization q is 1-2; a number-average functionality of epoxy group is 2.0 or 3.0; and $R_9$ is selected from the group consisting of hydrogen, $C_1$-$C_5$ alkyl, unsubstituted phenyl, substituted phenyl, unsubstituted aryl, substituted aryl, unsubstituted heterocyclic group, substituted heterocyclic group and a combination thereof.

In an embodiment, the first coupling agent and the second coupling agent are independently selected from the group consisting of hexadecyltrimethoxysilane [CAS: 16415-12-6], hexadecyl triethoxysilane [CAS:16415-13-7], 3-glycidoxypropyltrimethoxysilane [CAS: 2530-83-8], 3-glycidoxypropyltriethoxysilane [CAS:2602-34-8], γ-aminopropyltrimethoxysilane [CAS: 13822-56-5], γ-aminopropyl triethoxysilane [CAS: 919-30-2], n-(β-aminoethyl)-γ-aminopropyltrimethoxysilane [CAS: 1760-24-3], n-(β-aminoethyl)-γ-aminopropyltriethoxysilane [CAS: 5089-72-5], γ-(methacryloyloxy)propyltrimethoxysilane [CAS: 2530-85-0], 7-(methacryloyloxy)propyltriethoxysilane [CAS: 21142-29-0], γ-pinyltriamine propylmethyldimethoxy silane [CAS:99740-64-4], isopropyldioleic (dioctylphosphate) titanate [CAS: 61417-49-0], isopropyl tri(dioctylphosphate) titanate [CAS: 65345-34-8], titanium triisostearoylisopropoxide [CAS: 61417-49-0], bis(P,P-bis-ethylhexyl diphosphato)ethanediolato titanate [CAS:65467-75-6], tetraisopropyl di(dioctylphosphate) titanate [CAS: 65460-52-8] and a combination thereof; and the first modifier and the second modifier are independently selected from the group consisting of: oleic acid [CAS: 112-80-1], lauric acid [CAS: 143-07-7], caprylic acid [CAS: 124-07-2], ricinoleic acid [CAS: 141-22-0], rosin acid [CAS: 514-10-3], salicylic acid [CAS: 69-72-7], benzoic acid [CAS: 65-85-0], dodecylbenzene sulfonic acid [CAS: 27176-87-0], benzotriazole [CAS: 95-14-7], methylbenzotriazole [CAS: 29385-43-1] and a combination thereof.

In an embodiment, the first curing accelerator and the second curing accelerator are independently selected from the group consisting of phenol [CAS: 108-95-2], 2,4,6-tris (dimethylaminomethyl)phenol [CAS:90-72-2], triphenylphosphine [CAS:603-35-0], imidazole [CAS:288-32-4] and a combination thereof.

In an embodiment, the first thermally-conductive powder and the second thermally-conductive powder are independently selected from the group consisting of aluminum oxide ($Al_2O_3$), magnesium oxide (MgO), silicon oxide (SiO 2), aluminum nitride (MN), boron nitride (BN), zinc oxide (ZnO), silicon nitride ($Si_3N_4$), silicon carbide (SiC), boron carbide ($B_4C$) and a combination thereof;

the first thermally-conductive powder and the second thermally-conductive powder are independently spherical powder, flake powder, fibrous powder, irregular powder, hexagonal powder, cubic powder or a combination thereof; and with respect to the first thermally-conductive powder and the second thermally-conductive powder, an average particle size $D_{50}$ of single particle and agglomerated particle is (0.16-120) μm.

In an embodiment, the first flame retardant agent and the second flame retardant agent are independently selected from the group consisting of aluminum hydroxide (Al $(OH)_3$), magnesium hydroxide ($Mg(OH)_2$), melamine cyanurate [CAS:37640-57-6], ammonium polyphosphate (APP), aluminum hypophosphite ($Al(H_2PO_2)_3$), tricresyl phosphate [CAS:1330-78-5], diethyl ethyl phosphate [CAS: 682-30-4] and a combination thereof; and with respect to the first flame retardant agent and the second flame retardant agent, an average particle size $D_{50}$ of single particle and agglomerated particle is (0.3-30) μm.

In an embodiment, in step (1), the block polymerization of the telechelic carboxyl compound is performed through steps of:
  adding a first material and telechelic carboxyl polybutadiene to a reactor in a molar ratio of 1: (1.8-5);
  starting a stirring device to mix the telechelic carboxyl polybutadiene with the first material evenly to obtain a first reaction mixture; and
  keeping the first reaction mixture at a temperature ranging from room temperature to 145° C. for 0.5-6 h to obtain the first block polymerized product;
  wherein the higher the temperature is, the shorter a keeping time is; and the first material is isocyanate, epoxy resin or epoxy polyalkylsiloxane;
  when the first material is the isocyanate, the first block polymerized product is obtained according to formula (2);
  when the first material is epoxy resin, the first block polymerized product is obtained according to formula (3);
  when the first material is epoxy polyalkylsiloxane, the first block polymerized product is obtained according to formula (4); and
  if a molar ratio of the telechelic carboxyl polybutadiene to the isocyanate or the epoxy resin is greater than 2, and a molar ratio of the telechelic carboxyl polybutadiene to the epoxy polyalkylsiloxane is greater than 3, the telechelic carboxyl polybutadiene is in excess;
  in step (1), the block polymerization of the telechelic amino compound is performed as follows:

adding a second material and a third material to a reactor;
starting a stirring device to mix the second material with the third material evenly to obtain a second reaction mixture; and
keeping the second reaction mixture at a temperature ranging from room temperature to 145° C. for 0.5-6 h;
wherein the higher the temperature is, the shorter a keeping time is;
the second material is isocyanate, epoxy resin or epoxy polyalkylsiloxane;
the third material is telechelic amino polypropylene oxide or aminopolyalkylsiloxane;
when the second material is isocyanate or epoxy resin, a molar ratio of the second material to the third material is 1:(1.8-5); and when the second material is epoxy polyalkylsiloxane, a molar ratio of the second material to the third material is 1:(2.8-8);
when the second material is the isocyanate and the third material is the telechelic amino polypropylene oxide, the first block polymerized product is obtained according to formula (7);
when the second material is the isocyanate and the third material is aminopolyalkylsiloxane, the first block polymerized product is obtained according to formula (8);
when the second material is epoxy resin and the third material is the telechelic amino polypropylene oxide, the first block polymerized product is obtained according to formula (9);
when the second material is epoxy resin and the third material is aminopolyalkylsiloxane, the first block polymerized product is obtained according to formula (10);
when the second material is epoxy polyalkylsiloxane and the third material is the telechelic amino polypropylene oxide, the first block polymerized product is obtained according to formula (11);
when the second material is epoxy polyalkylsiloxane and the third material is aminopolyalkylsiloxane, the first block polymerized product is obtained according to formula (12);
in formulas (7-10), if a molar ratio of aminopolyalkylsiloxane or the telechelic amino polypropylene oxide to the epoxy resin or the isocyanate is greater than 2, the aminopolyalkylsiloxane or the telechelic amino polypropylene is in excess; and
in formulas (11-12), if a molar ratio of the aminopolyalkylsiloxane or the telechelic amino polypropylene oxide to the epoxy polyalkylsiloxane is greater than 3, the aminopolyalkylsiloxane or the telechelic amino polypropylene oxide is in excess;
in step (1), the block polymerization of the telechelic isocyanate compound is performed as follows:
adding isocyanate and a fourth material to a reactor;
starting a stirring device to mix the isocyanate with the fourth material evenly to obtain a third reaction mixture; and
keeping the third reaction mixture at a temperature ranging from room temperature to 145° C. for 0.5-6 h;
wherein the higher the temperature is, the shorter a keeping time is; and the fourth material is telechelic carboxyl polybutadiene, telechelic amino polypropylene oxide or aminopolyalkyl siloxane;
wherein when the fourth material is telechelic carboxyl polybutadiene or telechelic amino polypropylene oxide, a molar ratio of the isocyanate to the fourth material is (1.8-5):1; and when the fourth material is aminopolyalkylsiloxane, a molar ratio of the isocyanate to the fourth material is (2.8-8):1;
when the fourth material is the telechelic carboxyl polybutadiene, the second block polymerized product is obtained according to formula (14);
when the fourth material is the telechelic amino polypropylene oxide, the second block polymerized product is obtained according to formula (15);
when the fourth material is aminopolyalkylsiloxane, the second block polymerized product is obtained according to formula (16);
in formulas (14-15), if a molar ratio of the isocyanate to the telechelic carboxyl polybutadiene or telechelic amino polypropylene oxide is greater than 2, the isocyanate is in excess; and
in formula (16), if a molar ratio of the isocyanate to the aminopolyalkylsiloxane is greater than 3, the isocyanate is in excess; and
in step (1), the block polymerization of the telechelic epoxy compound is performed as follows:
adding a fifth material and a sixth material to a reactor;
starting a stirring device to mix the fifth material with the sixth material evenly to obtain a fourth reaction mixture; and
keeping the fourth reaction mixture at a temperature ranging from room temperature to 145° C. for (0.5-6) h;
wherein the higher the temperature is, the shorter a keeping time is; the fifth material is epoxy resin or epoxy polyalkylsiloxane; the sixth material is telechelic carboxyl polybutadiene, telechelic amino polypropylene oxide or aminopolyalkylsiloxane; when the sixth material is telechelic carboxyl polybutadiene or telechelic amino polypropylene oxide, a molar ratio of the fifth material to the sixth material is (1.8-5):1; and when the sixth material is aminopolyalkylsiloxane, a molar ratio of the fifth material to the sixth material is (2.8-8):1;
when the fifth material is the epoxy resin and the sixth material is the telechelic carboxyl polybutadiene, the second block polymerized product is obtained according to formula (18);
when the fifth material is the epoxy resin and the sixth material is the telechelic amino polypropylene oxide, the second block polymerized product is obtained according to formula (19);
when the fifth material is the epoxy polyalkylsiloxane and the sixth material is the telechelic carboxyl polybutadiene, the second block polymerized product is obtained according to formula (22);
when the fifth material is the epoxy polyalkylsiloxane and the sixth material is the telechelic amino polypropylene oxide, the second block polymerized product is obtained according to formula (23);
when the fifth material is the epoxy resin and the sixth material is aminopolyalkylsiloxane, the second block polymerized product is obtained according to formula (20);
when the fifth material is the epoxy polyalkylsiloxane and the sixth material is aminopolyalkylsiloxane, the second block polymerized product is obtained according to formula (24);
in formulas (18-19) and (22-23), if a molar ratio of the epoxy resin or the epoxy polyalkylsiloxane to the telechelic carboxyl polybutadiene or telechelic amino polypropylene oxide is greater than 2, the epoxy resin or the epoxy polyalkylsiloxane is in excess; and in formulas (20) and (24), if a molar ratio of the epoxy resin or the epoxy polyalkylsiloxane to the aminopolyalkylsiloxane is greater than 3, the epoxy resin or the epoxy polyalkylsiloxane is in excess.

In an embodiment, the step (2) is performed as follows:

in a reactor A equipped with a stirring device and/or a high-shear dispersing device, adding the telechelic carboxyl compound and/or the telechelic amino compound, and the first powder mixture; wherein the first powder mixture comprises a first coupling agent and/or a first modifier, and a first curing accelerator, a first thermally-conductive powder and a first flame retardant agent;

in a reactor B equipped with a stirring device and/or a high-shear dispersing device, adding the telechelic isocyanate compound or the telechelic epoxy compound, and the second powder mixture; wherein the second powder mixture comprises a second coupling agent and/or a second modifier, and a second curing accelerator, a second thermally-conductive powder and a second flame retardant agent;

wherein individual ingredients of the first powder mixture are batchwise added according to average particle size $D_{50}$ in order from small to large, and individual ingredients of the second powder mixture are batchwise added according to average particle size $D_{50}$ in order from small to large;

wherein each time an ingredient is added, a diameter of a stator and rotor is changed or a rotation speed of the high-shear dispersing device is adjusted to control a shear strength within 1200-233000 $s^{-1}$, and a slurry temperature is controlled within 0-145° C. for 0.1-4 h;

the shear strength is controlled as follows:

$$S_s = \frac{V}{\delta}; \quad (27)$$

wherein $S_s$ represents shear strength, in "1/s" or "$s^{-1}$";

V is a rotational linear velocity of an outer diameter of the rotor, or a rotational linear velocity of an outer diameter of the rotor relative to an adjacent rotor, in "m/s"; and δ is a minimum clearance between the stator and an adjacent rotor, or between two adjacent rotors, in "m";

when an average particle size $D_{50}$ of the first thermally-conductive powder, the first flame retardant agent, the second thermally-conductive powder and the second flame retardant agent is greater than 1.0 μm, the high-shear dispersing device is not required; in this case, the first thermally-conductive powder and the first flame retardant agent are added together and stirred by the stirring device at 100-1000 r/min, and the second thermally-conductive powder and the second flame retardant agent are added together and stirred by the stirring device at 100-1000 r/min.

In an embodiment, in step (3), a pressure is a gauge pressure; the positive pressure reaction is performed at 0.0-0.1 MPa; the negative pressure reaction is performed at (−0.01)-(−0.1) MPa to remove air, carbon dioxide, moisture and low-molecule impurities; the positive pressure reaction or the negative pressure reaction also comprises at least one of reactions expressed by formulas (2-4) and (7-12); and at least one of reactions expressed by formulas (14-16), (18-20) and (22-24); wherein while performing step (2) or at a later stage of step (2), a vacuum pump is started to reduce the pressure to −0.1 MPa.

In an embodiment, in step (4), the heating and cooling are performed as follows:

while performing steps (1), (2) and (3), filling a heat transfer medium into a jacket of a reactor; and driving, by a fluid circulation device, the heat transfer medium to perform heating and cooling;

wherein a heat source is a heat transfer oil furnace or an electric heating device; the heat transfer medium is a heat transfer oil, water or a cooling agent; and the fluid circulation device is a mold temperature controller, a magnetic drive pump, a reciprocating plunger pump, a peristaltic pump or a centrifugal pump.

In an embodiment, the reactor is selected from the group consisting of a kneader with or without the jacket, a planetary mixer or a chemical reaction kettle; a material of the reactor is selected from the group consisting of metal, enamel, glass, or ceramics; a shape of an inner cavity of the reactor is selected from the group consisting of a cuboid, a cylinder, an ellipsoid, a sphere and a combination thereof.

Compared to the prior art, the present disclosure has the following beneficial effects.

1. A ratio of a hard segment and a soft segment of the molecular chain can be adjusted in a wide range by the block synthesis method, and the bonding strength, the tensile strength and a secant modulus of the cured product can be flexibly obtained in a wide range;

2. reaction conditions are mild, and the purpose of the present disclosure can be achieved within a room temperature to 145° C. and a pressure range of (−0.1-0.1) MPa; and 3. the thermal conductivity can reach 11 W/(m·K), the shear bonding strength can reach 14 MPa, for the flame retardancy can be Vo-extinguished from fire, and the density is less than 2.89 g/cm³, which can meet the thermal conductivity and structural strength requirements of the CTP battery pack during a normal service and even a full life cycle.

BRIEF DESCRIPTION OF THE DRAWINGS

This FIGURE shows test results of a shear bonding strength of a combination of Example 7 and Example 19 in a volume ratio of 1:(0.25-2.0) after cured.

DETAILED DESCRIPTION OF EMBODIMENTS

The disclosure will be described completely and clearly below with reference to the accompanying drawings and embodiments to make the object, technical solutions, and beneficial effects of the present disclosure clearer.

Examples 1-46

Provided herein were examples of material formulation of a thermally-conductive structural adhesive for a new energy vehicle power battery, which were specifically described as follows.

a) Examples 1-12 were typical formulations of composition A, which were specifically described in Table 1;

b) Examples 13-24 were typical formulations of composition B, which were specifically described in Table 2;

c) Examples 25-36 were physical, chemical and electrical performance test results of composition A and composition B mixed and cured with a volume ratio of $V_a$ to $V_b$ of 1:1, which were specifically described in Table 3;

d) Example 37-46 were the test results of the shear bonding strength of combinations of the composition A in Example 7 and the composition B in Example 19, the composition A and the composition B were mixed and cured with a volume ratio of 1:(0.25-2.0), which were shown in Table 4 and FIGURE.

It can be seen from Tables 1~4 that the 46 examples of the material formulations can be regarded as typical formulations in a wide range within the boundaries of the present disclosure.

Examples 47-50

Provided herein was a method for preparing a thermally-conductive structural adhesive for a new energy vehicle power battery, which was carried out in conjunction with the 46 material formulations, and can be regarded as a typical process within the scope of the present disclosure.

Example 47

In step (1), a block polymerization of the telechelic carboxyl compound was performed through the following steps.

A first material and telechelic carboxyl polybutadiene were added to a reactor in a molar ratio of Table 1. A stirring device was started to mix the telechelic carboxyl polybutadiene with the first material evenly to obtain a first reaction mixture.

The first material was isocyanate, epoxy resin or epoxy polyalkylsiloxane.

When the first material was the isocyanate, a temperature of the first reaction mixture was controlled at 25-45° C. for 6 h, and the first block polymerized product was obtained according to a formula (2).

When the first material was epoxy resin, a temperature of the first reaction mixture was controlled at 75-135° C. for 4 h, and the first block polymerized product was obtained according to a formula (3).

When the first material was epoxy polyalkylsiloxane, a temperature of the first reaction mixture was controlled at 75-135° C. for 3.5 h, and the first block polymerized product was obtained according to a formula (4).

Since a molar ratio of the telechelic carboxyl polybutadiene to the isocyanate or the epoxy resin were greater than, and a molar ratio of the telechelic carboxyl polybutadiene to the epoxy polyalkylsiloxane was greater than 3, an excess of the telechelic carboxyl polybutadiene was negligible.

In step (1), the block polymerization of the telechelic amino compound was performed as follows.

A second material and a third material were added to a reactor in a molar ratio of Table 1. The stirring device was started to mix the second material with the third material evenly to obtain a second reaction mixture.

The second material was isocyanate, epoxy resin or epoxy polyalkylsiloxane.

The third material was telechelic amino polypropylene oxide or aminopolyalkylsiloxane.

When the second material was the isocyanate and the third material is the telechelic amino polypropylene oxide, a temperature of the second reaction mixture was controlled at 60-85° C. for 1.5 h, and the first block polymerized product was obtained according to a formula (7).

When the second material was the isocyanate and third material is aminopolyalkylsiloxane, a temperature of the second reaction mixture was controlled at 60-85° C. for 2 h, and the first block polymerized product was obtained according to a formula (8).

When the second material was epoxy resin and the third material is the telechelic amino polypropylene oxide, a temperature of the second reaction mixture was controlled at 65-90° C. for 1.5 h, and the first block polymerized product was obtained according to a formula (9).

When the second material was epoxy resin and the third material is aminopolyalkylsiloxane, a temperature of the second reaction mixture was controlled at 65-90° C. for 2.0 h, and the first block polymerized product was obtained according to a formula (10).

When the second material was epoxy polyalkylsiloxane and the third material was the telechelic amino polypropylene oxide, a temperature of the second reaction mixture was controlled at 55-75° C. for 3.5 h, and the first block polymerized product was obtained according to a formula (11).

When the second material was epoxy polyalkylsiloxane and the third material was aminopolyalkylsiloxane, a temperature of the second reaction mixture was controlled at 50-70° C. for 5.5 h, and the first block polymerized product was obtained according to a formula (12).

Since a molar ratio of aminopolyalkylsiloxane or the telechelic amino polypropylene oxide to the epoxy resin or the isocyanate was greater than 2, an excess of the aminopolyalkylsiloxane or the telechelic amino polypropylene oxide was negligible. Since a molar ratio of the aminopolyalkylsiloxane or the telechelic amino polypropylene oxide to the epoxy polyalkylsiloxane was greater than 3, an excess of the aminopolyalkylsiloxane or the telechelic amino polypropylene oxide was negligible.

In step (1), a block polymerization of the telechelic isocyanate compound was performed as follows.

The isocyanate and a fourth material were added to a reactor in a molar ratio of Table 2. The stirring device was started to mix the isocyanate with the fourth material evenly to obtain a third reaction mixture. The fourth material was telechelic carboxyl polybutadiene, telechelic amino polypropylene oxide or aminopolyalkylsiloxane.

When the fourth material was the telechelic carboxyl polybutadiene, a temperature of the third reaction mixture was controlled at 25-45° C. for 5.5 h, and a second block polymerized product was obtained according to a formula (14).

When the fourth material was the telechelic amino polypropylene oxide, a temperature of the third reaction mixture was controlled at 25-45° C. for 5.5 h, and the second block polymerized product was obtained according to a formula (15).

When the fourth material was aminopolyalkylsiloxane, a temperature of the third reaction mixture was controlled at 60-85° C. for 1.0 h, and the second block polymerized product was obtained according to a formula (16).

Since a molar ratio of the isocyanate to the telechelic carboxyl polybutadiene or telechelic amino polypropylene oxide was greater than 2, an excess of the isocyanate was negligible. Since a molar ratio of the isocyanate to the aminopolyalkylsiloxane was greater than 3, an excess of the isocyanate was negligible.

A block polymerization of the telechelic epoxy compound was performed as follows.

The fifth material and a six material were added to a reactor in a molar ratio of Table 2. The stirring device was started to mix the fifth material with the sixth material evenly to obtain a fourth reaction mixture.

The fifth material was epoxy resin or epoxy polyalkylsiloxane.

The sixth material was telechelic carboxyl polybutadiene, telechelic amino polypropylene oxide or aminopolyalkylsiloxane.

When the fifth material was the epoxy resin and the sixth material was the telechelic carboxyl polybutadiene, a temperature of the fourth reaction mixture was controlled at 55-75° C. for 3.5 h, and the second block polymerized product was obtained according to formula (18).

When the fifth material was the epoxy resin and the sixth material was the telechelic amino polypropylene oxide, a temperature of the fourth reaction mixture was controlled at 55-75° C. for 3.5 h, and the second block polymerized product was obtained according to formula (19).

When the fifth material was the epoxy polyalkylsiloxane and the sixth material was the telechelic carboxyl polybutadiene, a temperature of the fourth reaction mixture was controlled at 55-75° C. for 3.5 h, and the second block polymerized product was obtained according to formula (22).

When the fifth material was the epoxy polyalkylsiloxane and the sixth material was the telechelic amino polypropylene oxide, a temperature of the fourth reaction mixture was controlled at 55-75° C. for 3.5 h, and the second block polymerized product was obtained according to formula (23).

When the fifth material was the epoxy resin and the sixth material was aminopolyalkylsiloxane, a temperature of the fourth reaction mixture was controlled at 45-65° C. for 4.5 h, and the second block polymerized product was obtained according to a formula (20).

When the fifth material was the epoxy polyalkylsiloxane and the sixth material was aminopolyalkylsiloxane, a temperature of the fourth reaction mixture was controlled at 45-65° C. for 4.5 h, and the second block polymerized product was obtained according to formula (24):

Since a molar ratio of the epoxy resin or the epoxy polyalkylsiloxane to the telechelic carboxyl polybutadiene or telechelic amino polypropylene oxide was greater than 2, an excess of the epoxy resin or the epoxy polyalkylsiloxane was negligible. Since a molar ratio of the epoxy resin or the epoxy polyalkylsiloxane to the aminopolyalkylsiloxane was greater than 3, an excess of the epoxy resin or the epoxy polyalkylsiloxane was negligible.

Example 48

In a reactor A equipped with a stirring device and a high-shear dispersing device, the telechelic carboxyl compound and/or the telechelic amino compound, and the first powder mixture were added; where the first powder mixture included a first coupling agent and/or a first modifier, and a first curing accelerator, a first thermally-conductive powder and a first flame retardant agent in a molar ratio of Table 1.

In a reactor B equipped with a stirring device and a high-shear dispersing device, the telechelic isocyanate compound or the telechelic epoxy compound and the second powder mixture were added; where the second powder mixture included a second coupling agent and/or a second modifier, and a second curing accelerator, a second thermally-conductive powder and a second flame retardant agent in a molar ratio of Table 2.

Individual ingredients of the first powder mixture were batchwise added according to average particle size $D_{50}$ in order from small to large, and individual ingredients of the second powder mixture were batchwise added according to average particle size $D_{50}$ in order from small to large. Each time an ingredient was added, a diameter of a stator and rotation was adjusted to control a shear strength within 1200-5000 s$^{-1}$, and a slurry temperature was controlled within 5-155° C. for 0.25 h. The shear strength was expressed as follows:

$$S_s = \frac{V}{\delta}. \qquad (27)$$

The first thermally-conductive powder and the first flame retardant agent were added together and stirred by the stirring device at 100-1000 r/min, and the second thermally-conductive powder and the second flame retardant agent were added together and stirred by the stirring device at 100-1000 r/min.

Example 49

The method for controlling the positive pressure reaction or the negative pressure reaction was performed as follows.

While the step (2) was performed or at a later stage, a vacuum pump was started to slowly reduce the pressure to (−0.1) MPa for (0.25-1.5) h.

Example 50

In step (4), the heating and cooling were performed as follows.

While the step (a), (b) and (c) were performed, a heat transfer medium was filled into a jacket of a reactor. A fluid circulation device was configured to drive the heat transfer medium to perform heating and cooling. The heat transfer medium was a heat transfer oil. A heat source was an electric heating. The fluid circulation device was a mold temperature controller.

From mentioned above, the present disclosure has the following beneficial effects.

1. Using the block polymerization, a ratio of a hard segment and a soft segment of the molecular chain can be flexibly adjusted in a wide range to obtain physical, chemical and electrical properties of the thermally-conductive structural adhesive.

When the volume ratio of the composition A to the composition B was 1:1, a density of the thermally-conductive structural adhesive was 2.41-2.89 g/cm$^3$, a thermal conductivity was 5.90-10.82 W/(m·K), a tensile strength was 4.0-15.5 MPa, a breaking elongation was 11-78%, a secant modulus was 11-320 MPa, a shear bonding strength was 4.5-11.3 MPa, a disruptive strength was 19.0-22.3 kV/mm, a volume resistivity was 1.8×10$^{14}$-4.8×10$^{14}$, a flame retardancy was V-0-extinguished from fire.

When the volume ratio of the composition A to the composition B was 1:(0.25-2), a shear bonding strength was 0.7-14.9 MPa, which was continuously adjustable and controllable.

2. The thermal conductivity can meet the thermal conductivity and structural strength requirements of the CTP battery pack during a normal service and even a full life cycle.

TABLE 1

Formulations of composition A in the Examples

| Group boundary of material formula | Material composition or chemical structure parameters | Functionality (g) | Example 1 | Example 2 | Example 3 | Example 4 | Example 5 | Example 6 |
|---|---|---|---|---|---|---|---|---|
| 1.3-14% by weight of a block-polymerized telechelic carboxyl compound or a block-polymerized telechelic amino compound | formula (1) | | | | | | | |
| | $R_8$ = cyano group, x = 1, y = 0.7, z = 27 | 2.1 | 5.2 | — | — | — | — | — |
| | $R_8$ = vinyl, x = 1, y = 0.9, z = 9 | 2.2 | — | 6.3 | — | — | — | — |
| | formula (5) | | | | | | | |
| | degree of aggregation k = 50 | 2.0 | — | — | 10.8 | — | — | — |
| | degree of aggregation k = 25 | 2.0 | — | — | — | 11.3 | — | — |
| | formula (6) | | | | | | | |
| | $R_2$ = ethylene, $R_3$, $R_4$, $R_5$ and $R_6$ = methyl, m = 1, n = 22 | 2.9 | — | — | — | — | 13.8 | — |
| | $R_2$ = ethylene, $R_3$, $R_4$, $R_5$ and $R_6$ = methyl, m = 1, n = 8 | 2.9 | — | — | — | — | — | 7.1 |
| | formula (13) | | | | | | | |
| | TDI, 174 | 2.0 | — | 0.5 | — | — | — | — |
| | HDI, 168 | 2.0 | — | — | — | 0.6 | — | — |
| | IPDI, 222 | 2.0 | — | — | — | — | — | 0.9 |
| | formula (17) | | | | | | | |
| | $R_7$ = p-phenylenediethyl bisphenol A, l = 2 | 2.0 | — | — | — | — | — | — |
| | $R_7$ = p-phenylenediethyl bisphenol A, l = 1 | 2.0 | — | — | — | — | — | — |
| | bisphenol A 615 | 2.0 | — | — | — | — | — | — |
| | formula (21) | | | | | | | |
| | $R_2$ = ethylene, $R_3$, $R_4$, $R_5$ and $R_6$ = methyl, m = 1, n = 50 | 2.8 | — | — | — | — | — | — |
| | $R_2$ = ethylene, $R_3$, $R_4$, $R_5$ and $R_6$ = methyl, m = 1, n = 5 | 2.9 | — | — | — | — | — | — |
| 0.1-0.7% by weight of a coupling agent or a modifier | 3-glycidoxypropyltriethoxysilane [CAS: 2602-34-8] | 3.0 | 0.1 | — | — | 0.7 | — | 0.3 |
| | γ-aminopropyl triethoxysilane [CAS: 919-30-2] | 3.0 | — | 0.1 | — | — | 0.3 | — |
| | lauric acid [CAS: 143-07-7] | 1.0 | — | — | 0.6 | — | — | — |
| 0-1.0% by weight of a curing accelerator | imidazole [CAS:288-32-4] | 1.0 | 0.7 | — | — | — | — | — |
| | triphenylphosphine [CAS:603-35-0] | 0.0 | — | 0.2 | — | — | — | — |
| 84-92% by weight of a thermally-conductive powder | $Al_2O_3$, $D_{50}$ = (0.36, 89) μm, spherical shaped mixture | — | — | — | — | — | 4.8 | — |
| | AlN, $D_{50}$ = (5.2, 21, 89) μm, spherical shaped mixture | — | 86 | 84.6 | 86.9 | 85.0 | 80.2 | 52.4 |
| | HBN, $D_{50}$ = (0.63, 5.7, 21) μm, spherical hexagonal mixture | — | — | 5.8 | 1.2 | — | — | 38.3 |
| | $B_4C$, $D_{50}$ = (0.53, 13, 21) μm, heteromorphic mixture | — | 6.0 | — | — | 1.8 | — | — |
| 0.3-3.0% by weight of a flame retardant ingredient | $Mg(OH)_2$, $D_{50}$ = (5.5, 8.4) μm, heteromorphic mixture | 2.0 | — | 2.5 | — | — | — | — |
| | Al(OH)3, $D_{50}$ = (1.3, 21) μm, spherical hexagonal mixture | 3.0 | 2.0 | — | — | 0.6 | — | — |
| | APP, $D_{50}$ = (5.0, 7.5, 13) μm, prism heteromorphic mixture | 1.0 | — | — | — | — | — | — |
| | $Al(H_2PO_2)3$, $D_{50}$ = (0.3-8.1) μm, heteromorphic mixture | 6.0 | — | — | 0.4 | — | — | 1.0 |
| | tricresyl phosphate [CAS: 1330-78-5] | 0.0 | — | — | — | — | 1.0 | — |
| | Total | | 100 | 100 | 100 | 100 | 100 | 100 |

| Group boundary of material formula | Material composition or chemical structure parameters | Example 7 | Example 8 | Example 9 | Example 10 | Example 11 | Example 12 |
|---|---|---|---|---|---|---|---|
| 1.3-14% by weight of a block-polymerized telechelic carboxyl compound or a block-polymerized telechelic amino compound | formula (1) | | | | | | |
| | $R_8$ = cyano group, x = 1, y = 0.7, z = 27 | — | — | — | — | — | — |
| | $R_8$ = vinyl, x = 1, y = 0.9, z = 9 | 8.0 | — | — | 4.8 | — | — |
| | formula (5) | | | | | | |
| | degree of aggregation k = 50 | — | — | — | — | — | — |
| | degree of aggregation k = 25 | — | 8.0 | — | — | 4.1 | — |
| | formula (6) | | | | | | |
| | $R_2$ = ethylene, $R_3$, $R_4$, $R_5$ and $R_6$ = methyl, m = 1, n = 22 | — | — | — | — | — | — |
| | $R_2$ = ethylene, $R_3$, $R_4$, $R_5$ and $R_6$ = methyl, m = 1, n = 8 | — | — | 3.6 | — | — | 7.3 |
| | formula (13) | | | | | | |
| | TDI, 174 | — | — | — | — | — | — |
| | HDI, 168 | — | — | — | — | — | 0.7 |
| | IPDI, 222 | — | — | — | — | — | — |
| | formula (17) | | | | | | |
| | $R_7$ = p-phenylenediethyl bisphenol A, l = 2 | 2.1 | — | — | — | — | — |
| | $R_7$ = p-phenylenediethyl bisphenol A, l = 1 | — | 1.1 | — | — | — | — |

TABLE 1-continued

Formulations of composition A in the Examples

| | | | | | | | |
|---|---|---|---|---|---|---|---|
| | bisphenol A 615 formula (21) | — | — | 2.8 | — | — | — |
| | $R_2$ = ethylene, $R_3$, $R_4$, $R_5$ and $R_6$ = methyl, m = 1, n = 50 | — | — | — | 1.1 | — | — |
| | $R_2$ = ethylene, $R_3$, $R_4$, $R_5$ and $R_6$ = methyl, m = 1, n = 5 | — | — | — | — | 4.7 | — |
| 0.1-0.7% by weight of a coupling agent or a modifier | 3-glycidoxypropyltriethoxysilane [CAS: 2602-34-8] | 0.3 | — | — | 0.1 | — | 0.3 |
| | γ-aminopropyl triethoxysilane [CAS: 919-30-2] | — | 0.3 | 0.1 | — | — | — |
| | lauric acid [CAS: 143-07-7] | — | — | — | — | 0.1 | — |
| 0-1.0% by weight of a curing accelerator | imidazole [CAS:288-32-4] | 0.8 | — | — | — | — | — |
| | triphenylphosphine [CAS:603-35-0] | — | — | — | 0.4 | — | — |
| 84-92% by weight of a thermally-conductive powder | $Al_2O_3$, $D_{50}$ = (0.36, 89) μm, spherical shaped mixture | — | — | — | — | — | — |
| | AlN, $D_{50}$ = (5.2, 21, 89) μm, spherical shaped mixture | 85.9 | 90.4 | 87.0 | 86.5 | 86.6 | 85.9 |
| | HBN, $D_{50}$ = (0.63, 5.7, 21) μm, spherical hexagonal mixture | 2.4 | — | 4.4 | 4.4 | — | — |
| | $B_4C$, $D_{50}$ = (0.53, 13, 21) μm, heteromorphic mixture | — | — | — | — | 3.4 | 4.7 |
| 0.3-3.0% by weight of a flame retardant ingredient | $Mg(OH)_2$, $D_{50}$ = (5.5, 8.4) μm, heteromorphic mixture | — | — | 2.2 | — | — | — |
| | Al(OH)3, $D_{50}$ = (1.3, 21) μm, spherical hexagonal mixture | — | 0.3 | — | 2.7 | — | — |
| | APP, $D_{50}$ = (5.0, 7.5, 13) μm, prism heteromorphic mixture | 0.4 | — | — | — | 1.0 | — |
| | Al($H_2PO_2$)3, $D_{50}$ = (0.3-8.1) μm, heteromorphic mixture | — | — | — | — | — | — |
| | tricresyl phosphate [CAS: 1330-78-5] | — | — | — | — | — | 1.1 |
| | | 100 | 100 | 100 | 100 | 100 | 100 |

TABLE 2

Formulations of composition B in the Examples

| Group boundary of material formula | Material composition or chemical structure parameters or morphology | Functionality (g) | Example 13 | Example 14 | Example 15 | Example 16 | Example 17 | Example 18 |
|---|---|---|---|---|---|---|---|---|
| 1.3-14% by weight of a block-polymerized telechelic isocyanate compound or a block-polymerized telechelic epoxy compound | formula (1) $R_8$ = cyano group, x = 1, y = 0.7, z = 27 | 2.1 | — | — | — | — | — | — |
| | $R_8$ = vinyl, x = 1, y = 0.9, z = 9 | 2.2 | — | — | — | — | — | — |
| | formula (5) degree of aggregation k = 50 | 2.0 | — | — | — | — | — | — |
| | degree of aggregation k = 25 | 2.0 | — | — | — | 9.7 | — | — |
| | formula (6) $R_2$ = ethylene, $R_3$, $R_4$, $R_5$ and $R_6$ = methyl, m = 1, n = 22 | 2.9 | — | — | — | — | — | — |
| | $R_2$ = ethylene, $R_3$, $R_4$, $R_5$ and $R_6$ = methyl, m = 1, n = 8 | 2.9 | — | — | — | — | — | 5.4 |
| | formula (13) TDI, 174 | 2.0 | — | — | — | — | — | — |
| | HDI, 168 | 2.0 | — | — | — | 2.3 | — | — |
| | IPDI, 222 | 2.0 | — | — | — | — | — | 2.6 |
| | formula (17) $R_7$ = p-phenylenediethyl bisphenol A, 1 = 2 | 2.0 | — | — | — | — | — | — |
| | $R_7$ = p-phenylenediethyl bisphenol A, 1 = 1 | 2.0 | — | — | — | — | — | — |
| | bisphenol A 615 | 2.0 | — | 6.6 | 7.5 | — | — | — |
| | formula (21) $R_2$ = ethylene, $R_3$, $R_4$, $R_5$ and $R_6$ = methyl, m = 1, n = 50 | 2.8 | 3.3 | — | 3.6 | — | 13.6 | — |
| | $R_2$ = ethylene, $R_3$, $R_4$, $R_5$ and $R_6$ = methyl, m = 1, n = 5 | 2.9 | — | — | — | — | — | — |
| 0.1-0.7% by weight of a coupling agent or a modifier | 3-glycidoxypropyltriethoxysilane [CAS: 2602-34-8] | 3.0 | 1.0 | — | — | 0.65 | — | — |
| | γ-aminopropyl triethoxysilane [CAS: 919-30-2] | 3.0 | — | 0.32 | — | — | 0.5 | — |
| | lauric acid [CAS: 143-07-7] | 1.0 | — | — | 0.34 | — | — | 0.27 |
| 0-1.0% by weight of a curing accelerator | imidazole [CAS:288-32-4] | 1.0 | 1.6 | — | — | — | — | — |
| | triphenylphosphine [CAS:603-35-0] | 0.0 | — | 0.1 | — | — | — | — |

TABLE 2-continued

Formulations of composition B in the Examples

| Group boundary of material formula | Material composition or chemical structure parameters or morphology | | | | | | |
|---|---|---|---|---|---|---|---|
| 84-92% by weight of a thermally-conductive powder | $Al_2O_3$, $D_{50}$ = (0.36, 89) μm, spherical shaped mixture | — | — | — | — | 4.8 | — |
| | AlN, $D_{50}$ = (5.2, 21, 89) μm, spherical shaped mixture | — | 86 | 84.6 | 86.9 | 85.0 | 80.2 | 52.4 |
| | HBN, $D_{50}$ = (0.63, 5.7, 21) μm, spherical hexagonal mixture | — | — | 5.8 | 1.2 | — | — | 38.3 |
| | $B_4C$, $D_{50}$ = (0.53, 13, 21) μm, heteromorphic mixture | — | 6.0 | — | — | 1.8 | — | — |
| 0.3-3.0% by weight of a flame retardant ingredient | $Mg(OH)_2$, $D_{50}$ = (5.5, 8.4) μm, heteromorphic mixture | 2.0 | — | 2.5 | — | — | — |
| | $Al(OH)_3$, $D_{50}$ = (1.3, 21) μm, spherical hexagonal mixture | 3.0 | 2.0 | — | — | 0.6 | — |
| | APP, $D_{50}$ = (5.0, 7.5, 13) μm, prism heteromorphic mixture | 1.0 | — | — | — | — | — |
| | $Al(H_2PO_2)_3$, $D_{50}$ = (0.3-8.1) μm, heteromorphic mixture | 6.0 | — | — | 0.4 | — | 1.0 |
| | tricresyl phosphate [CAS: 1330-78-5] | 0.0 | — | — | — | 1.0 | — |
| | Total | 100 | 100 | 100 | 100 | 100 | 100 |

| Group boundary of material formula | Material composition or chemical structure parameters or morphology | Example 19 | Example 20 | Example 21 | Example 22 | Example 23 | Example 24 |
|---|---|---|---|---|---|---|---|
| 1.3-14% by weight of a block-polymerized telechelic isocyanate compound or a block-polymerized telechelic epoxy compound | formula (1) | | | | | | |
| | $R_8$ = cyano group, x = 1, y = 0.7, z = 27 | — | — | — | — | — | — |
| | $R_8$ = vinyl, x = 1, y = 0.9, z = 9 | 4.7 | — | — | 1.2 | — | — |
| | formula (5) | | | | | | |
| | degree of aggregation k = 50 | — | — | — | — | — | — |
| | degree of aggregation k = 25 | — | 6.1 | — | — | 4.5 | — |
| | formula (6) | | | | | | |
| | $R_2$ = ethylene, $R_3$, $R_4$, $R_5$ and $R_6$ = methyl, m = 1, n = 22 | — | — | — | — | — | — |
| | $R_2$ = ethylene, $R_3$, $R_4$, $R_5$ and $R_6$ = methyl, m = 1, n = 8 | — | — | 1.5 | — | — | 7.2 |
| | formula (13) | | | | | | |
| | TDI, 174 | — | — | — | — | — | — |
| | HDI, 168 | — | — | — | — | — | 0.7 |
| | IPDI, 222 | — | — | — | — | — | — |
| | formula (17) | | | | | | |
| | $R_7$ = p-phenylenediethyl bisphenol A, l = 2 | 5.8 | — | — | — | — | — |
| | $R_7$ = p-phenylenediethyl bisphenol A, l = 1 | — | 3.2 | — | — | — | — |
| | bisphenol A 615 | — | — | 4.8 | — | — | — |
| | formula (21) | | | | | | |
| | $R_2$ = ethylene, $R_3$, $R_4$, $R_5$ and $R_6$ = methyl, m = 1, n = 50 | — | — | — | 4.6 | — | — |
| | $R_2$ = ethylene, $R_3$, $R_4$, $R_5$ and $R_6$ = methyl, m = 1, n = 5 | — | — | — | — | 4.2 | — |
| 0.1-0.7% by weight of a coupling agent or a modifier | 3-glycidoxypropyltriethoxysilane [CAS: 2602-34-8] | 0.34 | — | — | — | — | 0.3 |
| | γ-aminopropyl triethoxysilane [CAS: 919-30-2] | — | 0.1 | 0.08 | — | — | — |
| | lauric acid [CAS: 143-07-7] | — | — | — | 0.1 | 0.3 | — |
| 0-1.0% by weight of a curing accelerator | imidazole [CAS:288-32-4] | 0.3 | — | — | — | — | — |
| | triphenylphosphine [CAS:603-35-0] | — | — | — | 0.4 | — | — |
| 84-92% by weight of a thermally-conductive powder | $Al_2O_3$, $D_{50}$ = (0.36, 89) μm, spherical shaped mixture | — | — | — | — | — | — |
| | AlN, $D_{50}$ = (5.2, 21, 89) μm, spherical shaped mixture | 85.9 | 90.4 | 87.0 | 86.5 | 86.6 | 85.9 |
| | HBN, $D_{50}$ = (0.63, 5.7, 21) μm, spherical hexagonal mixture | 2.4 | — | 4.4 | 4.4 | — | — |
| | $B_4C$, $D_{50}$ = (0.53, 13, 21) μm, heteromorphic mixture | — | — | — | — | 3.4 | 4.7 |
| 0.3-3.0% by weight of a flame retardant ingredient | $Mg(OH)_2$, $D_{50}$ = (5.5, 8.4) μm, heteromorphic mixture | — | — | 2.2 | — | — | — |
| | $Al(OH)_3$, $D_{50}$ = (1.3, 21) μm, spherical hexagonal mixture | — | 0.3 | — | 2.7 | — | — |
| | APP, $D_{50}$ = (5.0, 7.5, 13) μm, prism heteromorphic mixture | 0.4 | — | — | — | 1.0 | — |
| | $Al(H_2PO_2)_3$, $D_{50}$ = (0.3-8.1) μm, heteromorphic mixture | — | — | — | — | — | — |
| | tricresyl phosphate [CAS: 1330-78-5] | — | — | — | — | — | 1.1 |
| | | 100 | 100 | 100 | 100 | 100 | 100 |

TABLE 3

Test results of composition A and composition B in the Examples

| Item | Unit | Example 25 = Example 1 + Example 13 | Example 25 = Example 1 + Example 14 | Example 25 = Example 1 + Example 15 | Example 25 = Example 1 + Example 16 | Example 25 = Example 1 + Example 17 |
|---|---|---|---|---|---|---|
| Preparation method of sample | | \multicolumn{5}{c}{The sample was mixed with the composition A in Table 1 and the composition B in Table 2 in a volume ratio of 1:1, and cured in a normal temperature for 7 days.} | | | | |
| Density | g/cm$^3$ | 2.89 | 2.75 | 2.61 | 2.56 | 2.49 |
| Thermal conductivity | W/(m·K) | 6.39 | 6.28 | 6.15 | 6.16 | 6.65 |
| Tensile strength | MPa | 5.0 | 7.7 | 6.2 | 8.6 | 6.9 |
| Breaking elongation | % | 70 | 19 | 56 | 18 | 14 |
| Secant modulus | MPa | 16 | 90 | 22 | 99 | 118 |
| Shear bonding strength AL3003-AL3003 overlap | MPa | 4.7 | 5.9 | 5.1 | 6.6 | 5.4 |
| Disruptive strength | kV/m m | 22.3 | 22.3 | 20.7 | 20.6 | 21.1 |
| Volume resistivity | Ω·cm | $4.8 \times 10^{14}$ | $4.7 \times 10^{14}$ | $9.6 \times 10^{13}$ | $9.1 \times 10^{13}$ | $1.4 \times 10^{14}$ |
| Flame retardancy | — | V-0, Extinguished from fire | V-0, Extinguished from fire | V-0, Extinguished from fire | V-0, Extinguished from fire | V-0, |
| Aging at 85° C. and in a relative humidity of 85% for 500 h | — | Pass | Pass | Pass | Pass | Pass |
| Average particle size, D$_{50}$ | μm | 52.0 | 54.3 | 4.6 | 4.5 | 15.5 |

| Item | Unit | Example 25 = Example 1 + Example 18 | Example 25 = Example 1 + Example 19 | Example 25 = Example 1 + Example 20 | Example 25 = Example 1 + Example 21 |
|---|---|---|---|---|---|
| Preparation method of sample | | \multicolumn{4}{c}{The sample was mixed with the composition A in Table 1 and the composition B in Table 2 in a volume ratio of 1:1, and cured in a normal temperature for 7 days} | | | |
| Density | g/cm$^3$ | 2.41 | 2.60 | 2.72 | 2.80 |
| Thermal conductivity | W/(m·K) | 6.36 | 5.90 | 10.8 | 6.76 |
| Tensile strength | MPa | 8.8 | 14.7 | 15.5 | 6.2 |
| Breaking elongation | % | 11 | 11 | 12 | 61 |
| Secant modulus | MPa | 173 | 320 | 305 | 21 |
| Shear bonding strength AL3003-AL3003 overlap | MPa | 6.9 | 10.7 | 11.3 | 5.1 |
| Disruptive strength | kV/m m | 22.1 | 21.2 | 22.3 | 22.3 |
| Volume resistivity | Ω·cm | $4.0 \times 10^{14}$ | $1.6 \times 10^{14}$ | $4.7 \times 10^{14}$ | $4.7 \times 10^{14}$ |
| Flame retardancy | — | V-0, Extinguished from fire | V-0, Extinguished from fire | V-0, Extinguished from fire | V-0, Extinguished from fire |
| Aging at 85° C. and in a relative humidity of 85% for 500 h | — | Pass | Pass | Pass | Pass |
| Average particle size, D$_{50}$ | μm | 20.2 | 17.4 | 88.8 | 61.0 |

| Item | Unit | Example 25 = Example 1 + Example 22 | Example 25 = Example 1 + Example 23 | Example 25 = Example 1 + Example 24 | Experimental method |
|---|---|---|---|---|---|
| Preparation method of sample | | \multicolumn{3}{c}{The sample was mixed with the composition A in Table 1 and the composition B in Table 2 in a volume ratio of 1:1, and cured in a normal temperature for 7 days} | | | |
| Density | g/cm$^3$ | 2.80 | 2.70 | 2.73 | ASTM D 792 |

TABLE 3-continued

Test results of composition A and composition B in the Examples

| | | | | | |
|---|---|---|---|---|---|
| Thermal conductivity | W/(m · K) | 6.25 | 8.90 | 6.95 | ASTM D 5470 |
| Tensile strength | MPa | 5.9 | 4.0 | 5.6 | ASTM D 412 |
| Breaking elongation | % | 62 | 78 | 16 | ASTM D 412 |
| Secant modulus | MPa | 19 | 11 | 95 | ASTM D 412 |
| Shear bonding strength AL3003-AL3003 overlap | MPa | 5.0 | 4.5 | 4.9 | ISO 4587 |
| Disruptive strength | kV/mm | 22.3 | 19.0 | 20.0 | ASTM D 149 |
| Volume resistivity | Ω · cm | $4.7 \times 10^{14}$ | $1.8 \times 10^{13}$ | $4.7 \times 10^{13}$ | ASTM D2 57 |
| Flame retardancy | — | V-0, Extinguished from fire | V-0, Extinguished from fire | V-0, | UL94 |
| Aging at 85° C. and in a relative humidity of 85% for 500 h | — | Pass | Pass | Pass | IEC 60068-2 |
| Average particle size, $D_{50}$ | μm | 60.1 | 15.5 | 14.6 | Laser particle analyzer |

TABLE 4

Test results of a shear bonding strength of a thermally-conductive structural adhesive with different volume ratios of composition A and composition B

| Sample | Composition A in Example 7, $V_a$ (mL) | Composition B in Example 19, $V_b$ (mL) | $V_a + V_b$ (mL) | Volume ratio of $V_a$:$V_b$ | Shear bonding strength (MPa) |
|---|---|---|---|---|---|
| Example 37 | 9.8 | 39.9 | 49.7 | 0.25 | 3.6 |
| Example 38 | 11.3 | 39.1 | 50.4 | 0.29 | 9.1 |
| Example 39 | 12.6 | 37.7 | 50.3 | 0.33 | 10.7 |
| Example 40 | 14.6 | 35.4 | 50.0 | 0.41 | 13.9 |
| Example 41 | 16.9 | 33.3 | 50.2 | 0.51 | 14.9 |
| Example 42 | 21.2 | 28.9 | 50.1 | 0.73 | 13.5 |
| Example 43 | 24.8 | 25.1 | 49.9 | 1.0 | 10.7 |
| Example 44 | 28.9 | 21.4 | 50.3 | 1.4 | 3.8 |
| Example 45 | 31.0 | 19.1 | 50.1 | 1.6 | 2.4 |
| Example 46 | 33.2 | 16.8 | 50.0 | 2.0 | 0.7 |

What is claimed is:

1. A thermally-conductive structural adhesive for new energy power batteries, comprising:
a composition A comprising 3.3-14% by weight of a block polymerized telechelic carboxyl compound, a block polymerized telechelic amino compound or a combination thereof;
0.1-1.0% by weight of a first coupling agent, a first modifier or a combination thereof;
0-1.6% by weight of a first curing accelerator;
84-92% by weight of a first thermally-conductive powder; and
0.3-3.0% by weight of a first flame retardant agent; and
a composition B comprising 3.3-14% by weight of a block polymerized telechelic isocyanate compound, a block polymerized telechelic epoxy compound or a combination thereof;
0-1.0% by weight of a second coupling agent, a second modifier or a combination thereof;
0-1.6% by weight of a second curing accelerator;
84-92% by weight of a second thermally-conductive powder; and
0.3-3% by weight of a second flame retardant agent;
wherein a weight or volume ratio of the composition A to the composition B is 1:(0.25-2); and
the composition A and the composition B are mixed evenly and cured to obtain the thermally-conductive structural adhesive.

2. The thermally-conductive structural adhesive of claim 1, wherein the block polymerized telechelic carboxyl compound is selected from the group consisting of: telechelic carboxyl polybutadiene of formula (1), a product formed by reaction of isocyanate and the telechelic carboxyl polybutadiene according to formula (2) and removal of carbon dioxide, a product formed by reaction of epoxy resin and the telechelic carboxyl polybutadiene according to formula (3), a product formed by reaction of epoxy polyalkylsiloxane and the telechelic carboxyl polybutadiene according to formula (4) and a combination thereof;

wherein the formula (1) is expressed as:

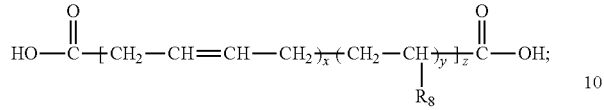

wherein in the formula (1), x=1, and y is a mole ratio relative to x, and selected from 0-1.0; z represents number-average degree of polymerization, and is selected from 9-27, and a number-average functionality of a carboxyl group is 2.1-2.2; and $R_8$ is a vinyl or a cyano group;

wherein the formula (2) is expressed as:

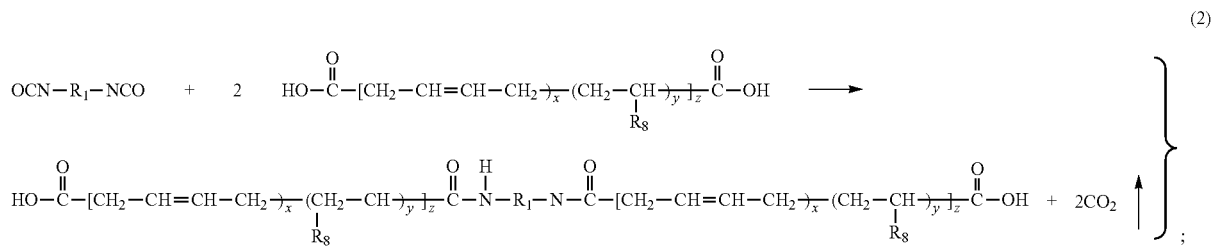

wherein in the formula (2), a number-average functionality of an isocyanate group in isocyanate OCN—$R_1$—NCO is 2.0; and $R_1$ is selected from the group consisting of alkylene, unsubstituted phenylene, substituted phenylene, unsubstituted arylene, substituted arylene, unsubstituted heterocyclic alkene, substituted heterocyclic alkene and a combination thereof, wherein alkene is a group formed after a carbon-hydrogen bond in an organic compound is homolytically cleaved to remove two hydrogen atoms;

wherein the formula (3) is expressed as:

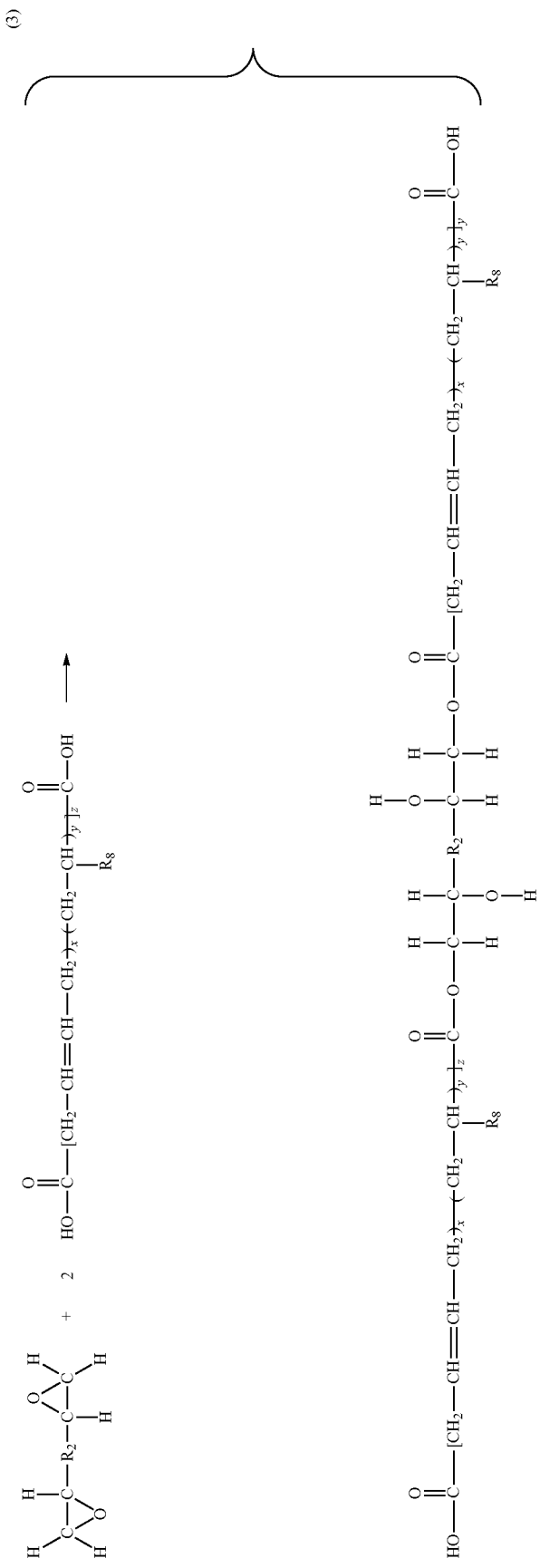

wherein in the formula (3), the epoxy compound meets a definition of formula (17), the formula (17) is expressed as:

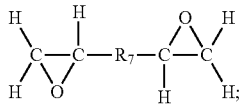
(17)

wherein in the formula (17), a number-average functionality of an epoxy group is 2.0 or 3.0; and $R_7$ is selected from the group consisting of: a group of formula (25), a group of formula (26), alkylene, unsubstituted phenylene, substituted phenylene, unsubstituted arylene, substituted arylene, unsubstituted heterocyclic alkene, substituted heterocyclic alkene and a combination thereof;

wherein the formula (25) is expressed as:

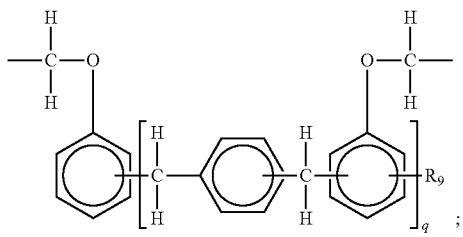
(25)

wherein in the formula (25), a number-average degree of polymerization q is 1-2; a number-average functionality of epoxy group is 2.0 or 3.0; and $R_9$ is selected from the group consisting of: hydrogen, $C_1$-$C_5$ alkyl, unsubstituted phenyl, substituted phenyl, unsubstituted aryl, substituted aryl, unsubstituted heterocyclic group, substituted heterocyclic group and a combination thereof;

wherein the formula (26) is expressed as:

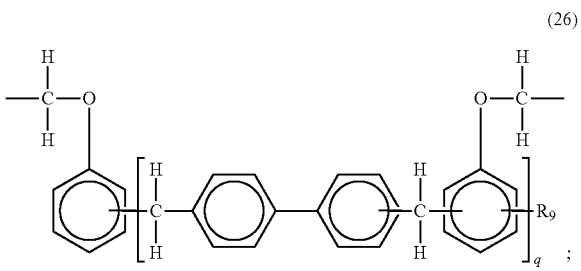
(26)

wherein in the formula (26), a number-average degree of polymerization q is 1-2; a number-average functionality of epoxy group is 2.0 or 3.0; and $R_9$ is selected from the group consisting of: hydrogen, $C_1$-$C_5$ alkyl, unsubstituted phenyl, substituted phenyl, unsubstituted aryl, substituted aryl, unsubstituted heterocyclic group, substituted heterocyclic group and a combination thereof; and wherein the formula (4) is expressed as:

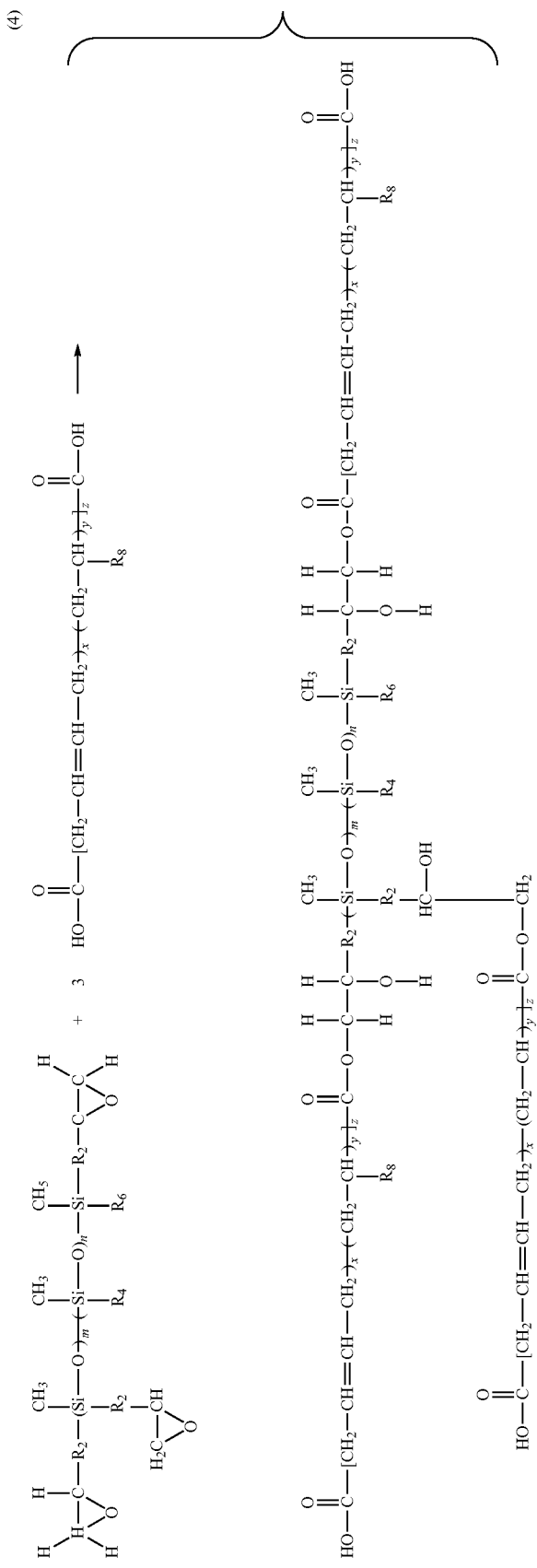

wherein in the formula (4), the epoxy compound meets a definition of formula (21), the formula (21) is expressed as:

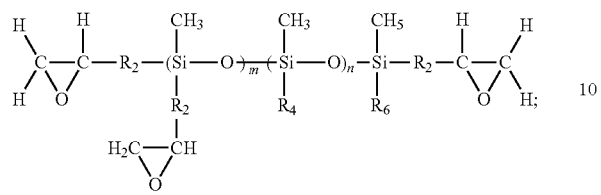
(21)

wherein in the formula (21), m and n respectively represent a number-average polymerization degree of alkyl siloxane, m is greater than or equal to 0, and n is 5-50; a number-average functionality of epoxy group is 2.8-3.0; $R_2$ is a $C_2$-$C_5$ alkylene; and $R_3$, $R_4$, $R_5$ and $R_6$ are independently selected from the group consisting of: alkyl, unsubstituted phenyl, substituted phenyl, unsubstituted aryl, substituted aryl, unsubstituted heterocyclic group, substituted heterocyclic group and a combination thereof.

3. The thermally-conductive structural adhesive of claim 1, wherein the block polymerized telechelic amino compound is selected from the group consisting of: a telechelic amino polypropylene oxide of formula (5), an aminopolyalkylsiloxane of formula (6), a product formed by reaction of isocyanate and the telechelic amino polypropylene oxide according to formula (7), a product formed by reaction of isocyanate and the aminopolyalkylsiloxane according to formula (8), a reaction product formed by reaction of an epoxy resin and the telechelic amino polypropylene oxide according to formula (9), a product formed by reaction of the epoxy resin and the aminopolyalkylsiloxane according to formula (10), a product formed by reaction of epoxy polyalkylsiloxane and the telechelic amino polypropylene oxide according to formula (11), and a product formed by reaction of the epoxy polyalkylsiloxane and the aminopolyalkylsiloxane according to formula (12);

wherein the formula (5) is expressed as:

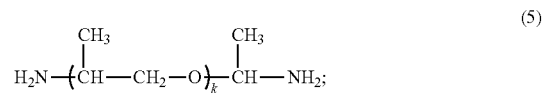
(5)

wherein in the formula (5), k represents a number-average degree of polymerization, and is selected from 25-50; and a number-average functionality of an amino group is 2.0-2.3;

wherein the formula (6) is expressed as:

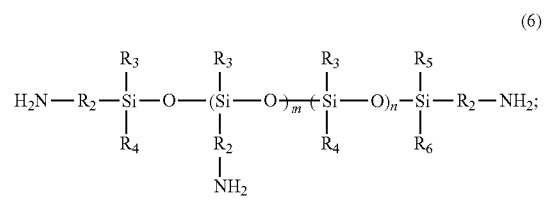
(6)

wherein in the formula (6), number-average degree of polymerization m is 0-1, and number-average degree of polymerization n is 8-22; a number-average functionality of an amino group is 2.9-3.3; $R_2$ is a $C_2$-$C_5$ alkylene; and $R_3$, $R_4$, $R_5$ and $R_6$ are independently selected from the group consisting of alkyl, unsubstituted phenyl, substituted phenyl, unsubstituted aryl, substituted aryl, unsubstituted heterocyclic group, substituted heterocyclic group and a combination thereof;

wherein the formula (7) is expressed as:

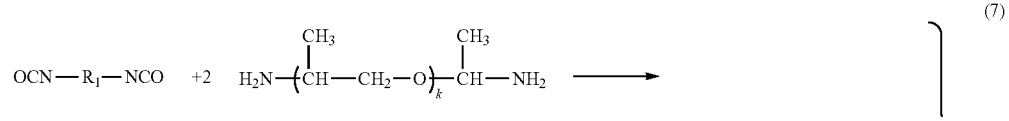

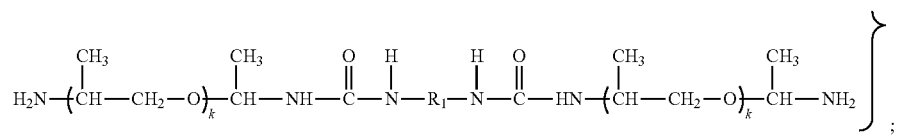
(7)

wherein the formula (8) is expressed as:

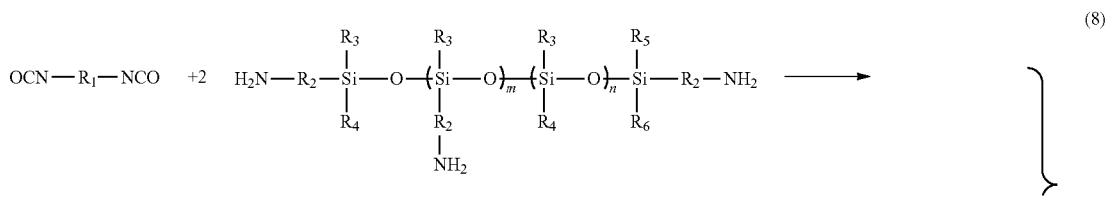
(8)

-continued

wherein in formula (7) and formula (8), the isocyanate compound meets a definition of formula (13) expressed as:

$$OCN-R_1-NCO \quad (13);$$

wherein a number-average functionality of an isocyanate group is 2.0; and $R_1$ is selected from the group consisting of alkylene, unsubstituted phenylene, substituted phenylene, unsubstituted arylene, substituted arylene, unsubstituted heterocyclic alkene, substituted heterocyclic alkene and a combination thereof;

wherein the formula (9) is expressed as:

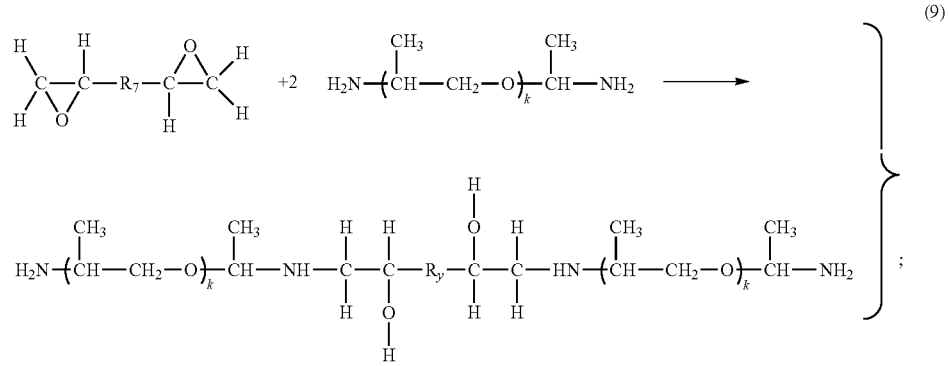

(9)

wherein the formula (10) is expressed as:

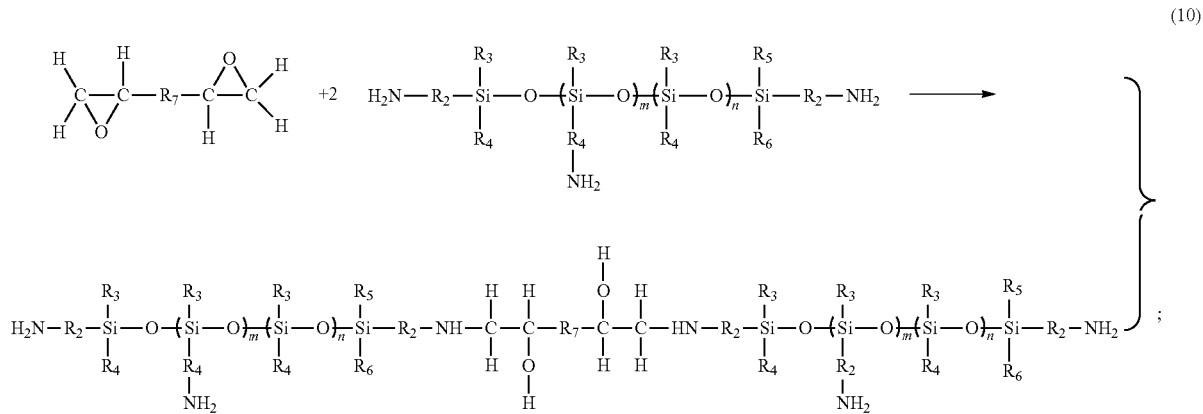

(10)

wherein in formula (9) and formula (10), the epoxy component meets a definition of formula (17) expressed as:

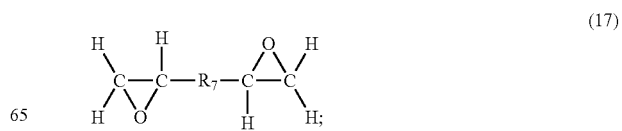

(17)

wherein a number-average functionality of an epoxy group is 2.0 or 3.0; and $R_7$ is selected from the group consisting of a group of formula (25), a group of formula (26), alkylene, unsubstituted phenylene, substituted phenylene, unsubstituted arylene, substituted arylene, unsubstituted heterocyclic alkene, substituted heterocyclic alkene and a combination thereof;
wherein the formula (25) is expressed as:

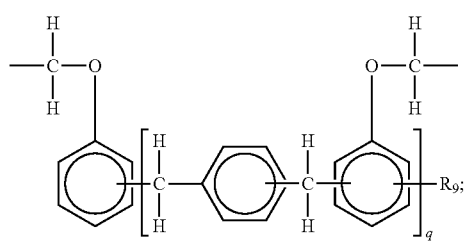

(25)

wherein in the formula (25), a number-average degree of polymerization q is 1-2; a number-average functionality of epoxy group is 2.0 or 3.0; and $R_9$ is selected from the group consisting of: hydrogen, $C_1$-$C_5$ alkyl, unsubstituted phenyl, substituted phenyl, unsubstituted aryl, substituted aryl, unsubstituted heterocyclic group, substituted heterocyclic group and a combination thereof;
the formula (26) is expressed as:

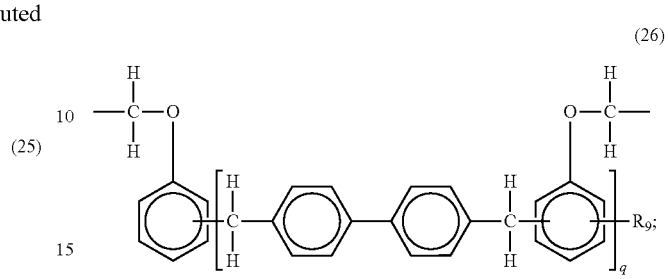

(26)

wherein in the formula (26), a number-average degree of polymerization q is 1-2; a number-average functionality of epoxy group is 2.0 or 3.0; and $R_9$ is selected from the group consisting of: hydrogen, $C_1$-$C_5$ alkyl, unsubstituted phenyl, substituted phenyl, unsubstituted aryl, substituted aryl, unsubstituted heterocyclic group, substituted heterocyclic group and a combination thereof;
wherein the formula (11) is expressed as:

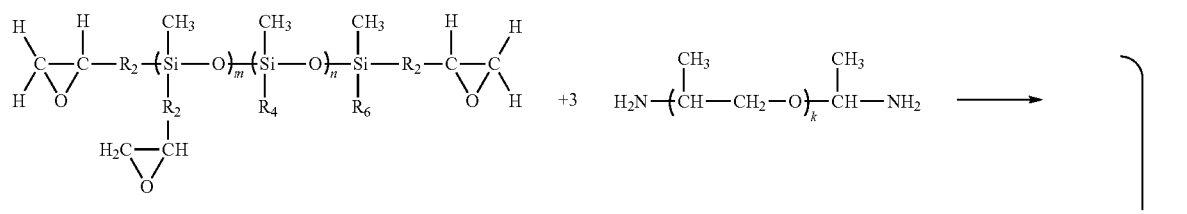

(11)

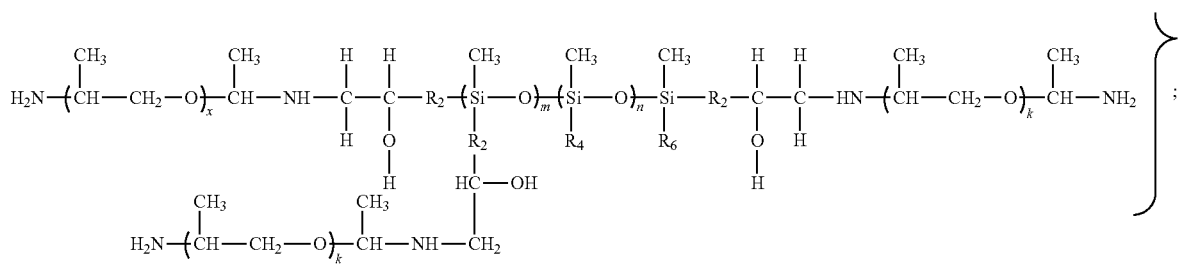

wherein the formula (12) is expressed as:

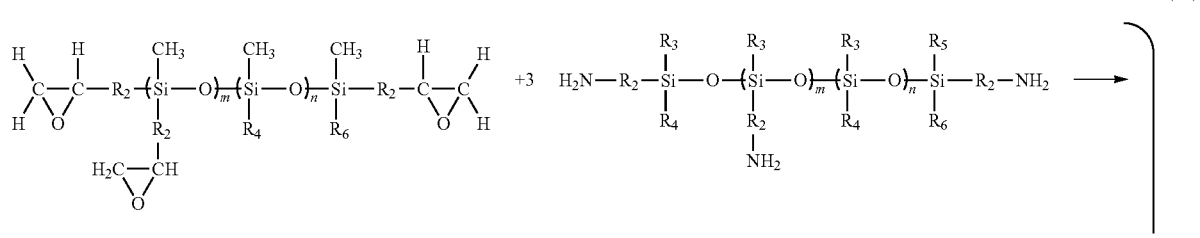

(12)

-continued

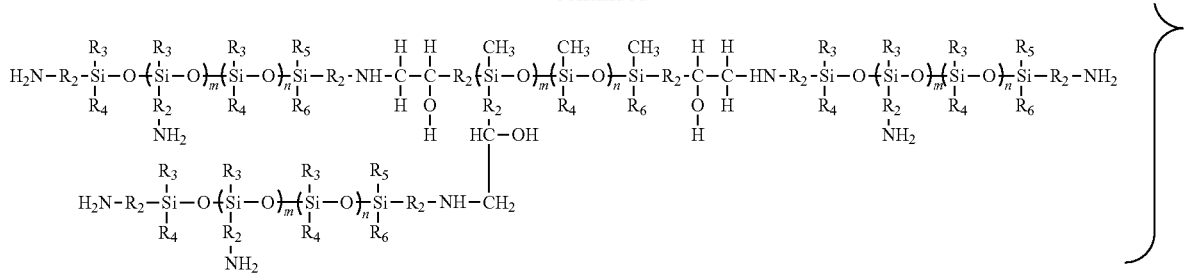

and wherein in formula (11) and formula (12), the epoxy polyalkylsiloxane component meets a definition of formula (21) expressed as:

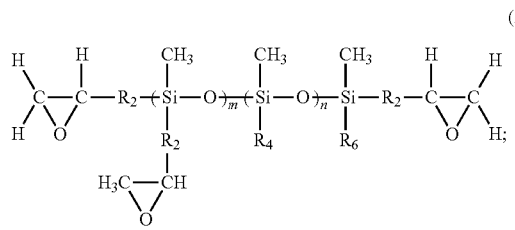

wherein m and n respectively represent a number-average polymerization degree of alkyl siloxane, m is greater than or equal to 0, and n is 5-50; a number-average functionality of epoxy group is 2.8-3.0; $R_2$ is a $C_2$-$C_5$ alkylene; and $R_3$, $R_4$, $R_5$ and $R_6$ are independently selected from the group consisting of: alkyl, unsubstituted phenyl, substituted phenyl, unsubstituted aryl, substituted aryl, unsubstituted heterocyclic group, substituted heterocyclic group and a combination thereof.

4. The thermally-conductive structural adhesive of claim 1, wherein the block polymerized telechelic isocyanate compound is selected from the group consisting of: an isocyanate of formula (13), a product formed by reaction of the isocyanate and a telechelic carboxyl polybutadiene according to formula (14) and removal of carbon dioxide, a product formed by reaction of the isocyanate and telechelic amino polypropylene oxide according to formula (15), a product formed by reaction of the isocyanate and aminopolyalkylsiloxane according to formula (16) and a combination thereof;

wherein the formula (13) is expressed as:

$$OCN-R_1-NCO \quad (13);$$

wherein in the formula (13), a number-average functionality of an isocyanate group is 2.0; and $R_1$ is selected from the group consisting of alkylene, unsubstituted phenylene, substituted phenylene, unsubstituted arylene, substituted arylene, unsubstituted heterocyclic alkene, substituted heterocyclic alkene and a combination thereof;

wherein the formula (14) is expressed as:

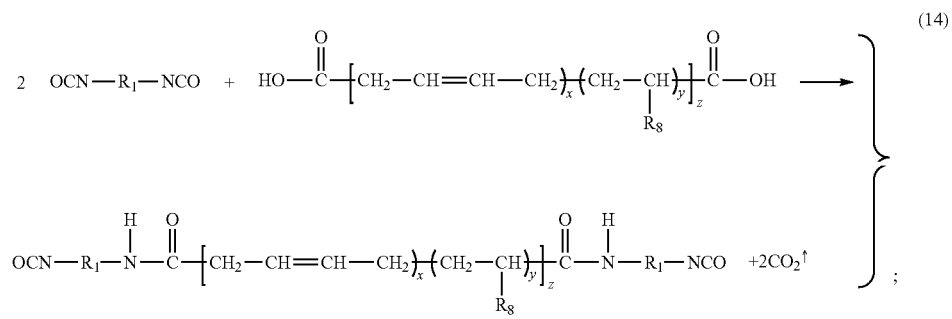

wherein in formula (14), the telechelic carboxyl polybutadiene component meets a definition of formula (1) expressed as:

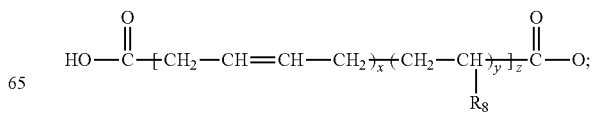

wherein x=1, and y is a mole ratio relative to x, and selected from 0-1.0; z represents number-average degree of polymerization, and is selected from 9-27, and a number-average functionality of a carboxyl group is 2.1-2.2; and $R_8$ is a vinyl or a cyano group;
wherein the formula (15) is expressed as:

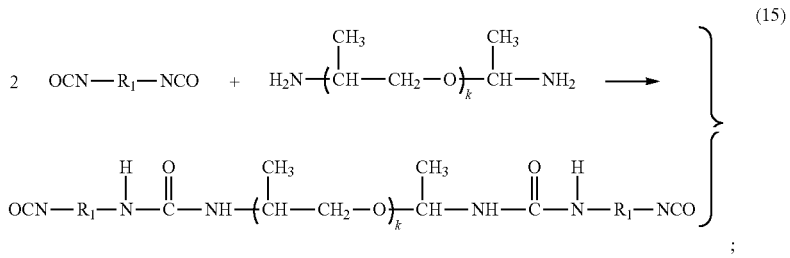
(15)

wherein in formula (15), the telechelic amino polypropylene oxide component meets a definition of formula (5) expressed as:

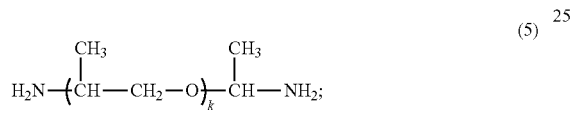
(5)

wherein k represents a number-average degree of polymerization, and is selected from 25-50; and a number-average functionality of an amino group is 2.0-2.3; and wherein the formula (16) is expressed as:

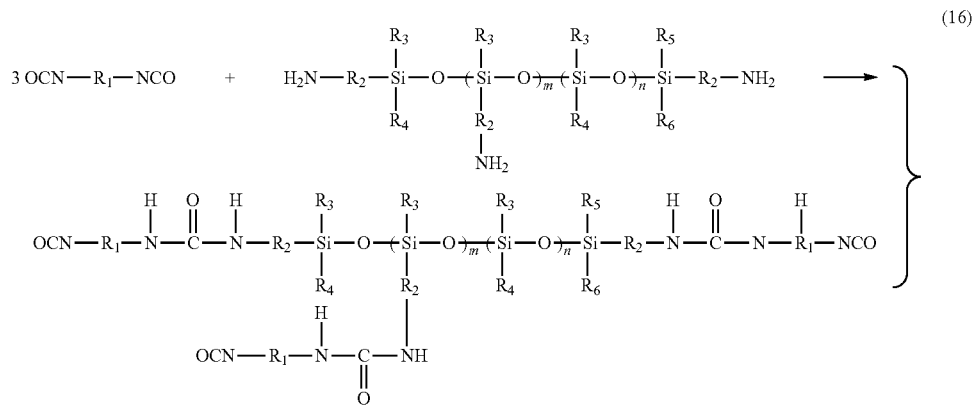
(16)

wherein in formula (16), the aminopolyalkylsiloxane component meets a definition of formula (6) expressed as:

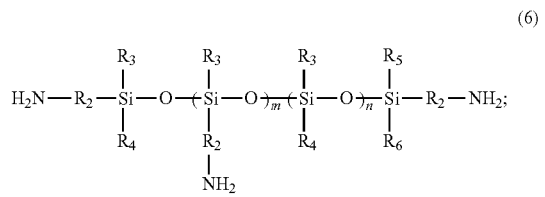
(6)

wherein number-average degree of polymerization m is 0-1, and number-average degree of polymerization n is 8-22; a number-average functionality of an amino group is 2.9-3.3; $R_2$ is a $C_2$-$C_5$ alkylene; and $R_3$, $R_4$, $R_5$ and $R_6$ are independently selected from the group consisting of alkyl, unsubstituted phenyl, substituted phenyl, unsubstituted aryl, substituted aryl, unsubstituted heterocyclic group, substituted heterocyclic group and a combination thereof.

5. The thermally-conductive structural adhesive of claim 1, wherein the block polymerized telechelic epoxy compound is selected from the group consisting of: an epoxy resin of formula (17), a product formed by reaction of the epoxy resin and telechelic carboxyl polybutadiene according to formula (18), a product formed by reaction of the epoxy resin and telechelic amino polypropylene oxide according to formula (19), a product formed by reaction of the epoxy resin and aminopolyalkylsiloxane according to formula (20), epoxy polyalkylsiloxane of formula (21), a product formed by reaction of the epoxy polyalkylsiloxane and the telechelic carboxyl polybutadiene according to formula (22), a product formed by reaction of the epoxy polyalkylsiloxane and the telechelic amino polypropylene oxide according to formula (23), a product formed by reaction of the epoxy polyalkylsiloxane and the aminopolyalkylsiloxane according to formula (24) and a combination thereof;

wherein the formula (17) is expressed as:

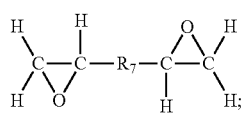
(17)

wherein in the formula (17), a number-average functionality of an epoxy group is 2.0 or 3.0; and $R_7$ is selected from the group consisting of a group of formula (25), a group of formula (26), alkylene, unsubstituted phenylene, substituted phenylene, unsubstituted arylene, substituted arylene, unsubstituted heterocyclic alkene, substituted heterocyclic alkene and a combination thereof;

wherein the formula (18) is expressed as:

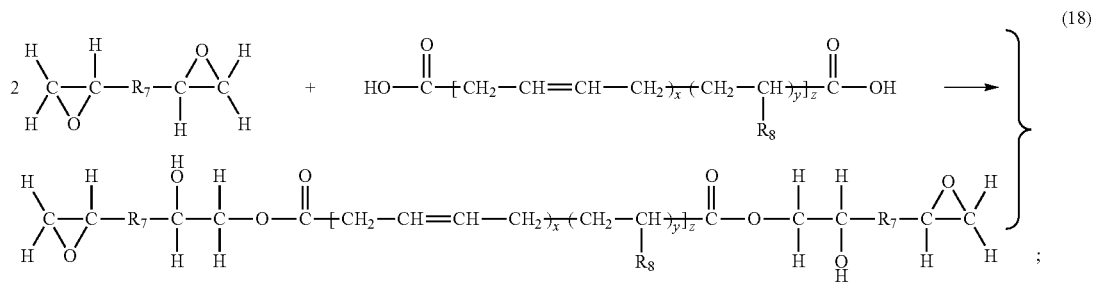
(18)

wherein in formula (18), the telechelic carboxyl polybutadiene component meets a definition of formula (1) expressed as:

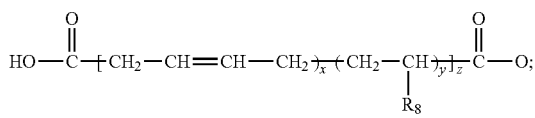
(1)

wherein x=1, and y is a mole ratio relative to x, and selected from 0-1.0; z represents number-average degree of polymerization, and is selected from 9-27, and a number-average functionality of a carboxyl group is 2.1-2.2; and $R_8$ is a vinyl or a cyano group;

wherein the formula (19) is expressed as:

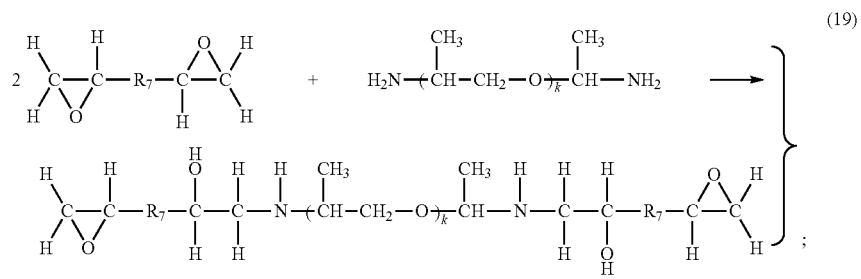
(19)

wherein in formula (19), the telechelic amino polypropylene oxide component meets a definition of formula (5) expressed as:

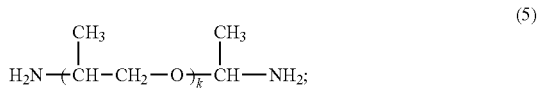
(5)

wherein k represents a number-average degree of polymerization, and is selected from 25-50; and a number-average functionality of an amino group is 2.0-2.3;

wherein the formula (20) is expressed as:

and $R_6$ are independently selected from the group consisting of alkyl, unsubstituted phenyl, substituted phenyl, unsubstituted aryl, substituted aryl, unsubstituted heterocyclic group, substituted heterocyclic group and a combination thereof;

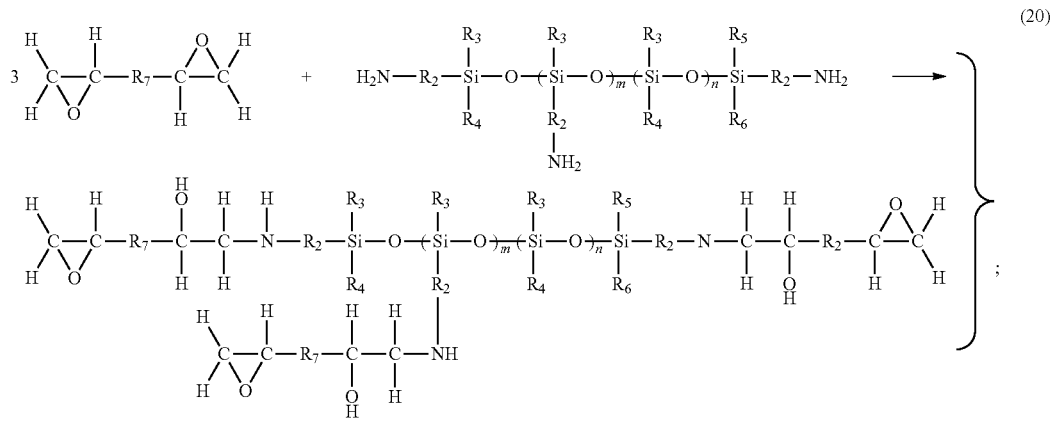

(20)

wherein in formula (20), the aminopolyalkylsiloxane component meets a definition of formula (6) expressed as:

wherein the formula (21) is expressed as:

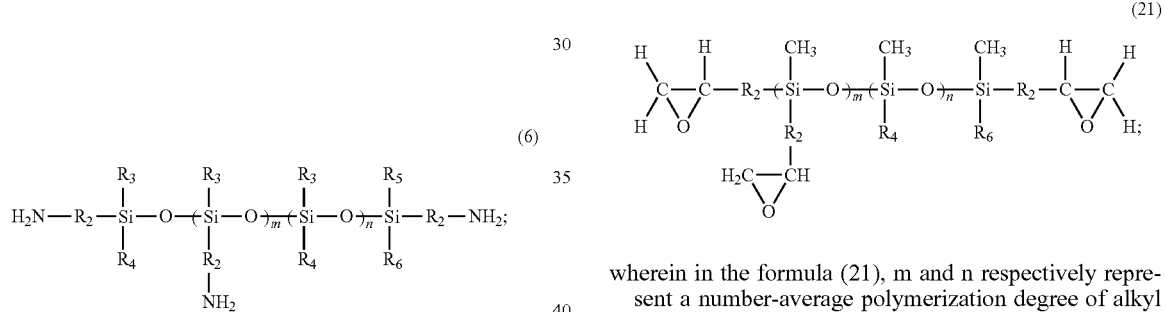

(6)

(21)

wherein the number-average degree of polymerization m is 0-1, and number-average degree of polymerization n is 8-22; a number-average functionality of an amino group is 2.9-3.3; $R_2$ is a $C_2$-$C_5$ alkylene; and $R_3$, $R_4$, $R_5$ wherein in the formula (21), m and n respectively represent a number-average polymerization degree of alkyl siloxane, m is greater than or equal to 0, and n is 5-50; a number-average functionality of epoxy group is 2.8-3.0; $R_2$ is a $C_2$-$C_5$ alkylene; and $R_3$, $R_4$, $R_5$ and $R_6$ are independently selected from the group consisting of alkyl, unsubstituted phenyl, substituted phenyl, unsubstituted aryl, substituted aryl, unsubstituted heterocyclic group, substituted heterocyclic group and a combination thereof;

wherein the formula (22) is expressed as:

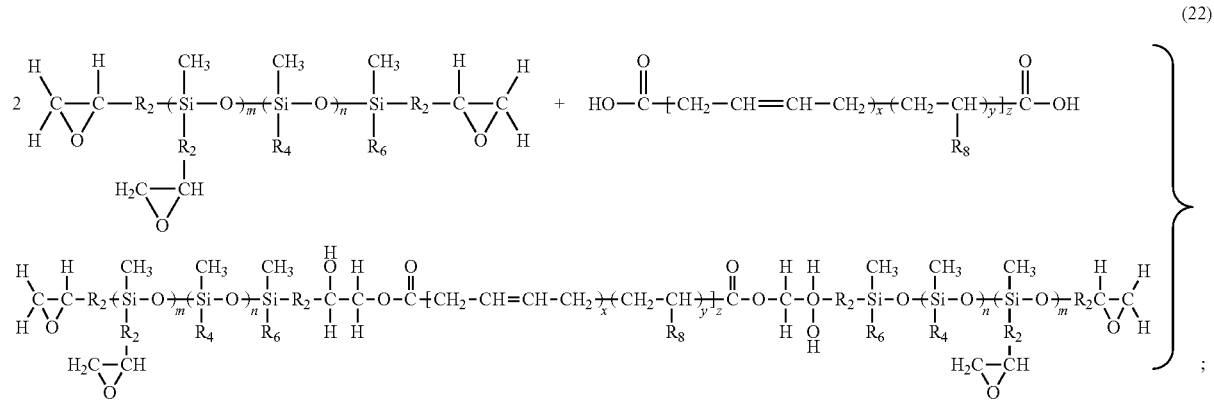

(22)

wherein the formula (23) is expressed as:

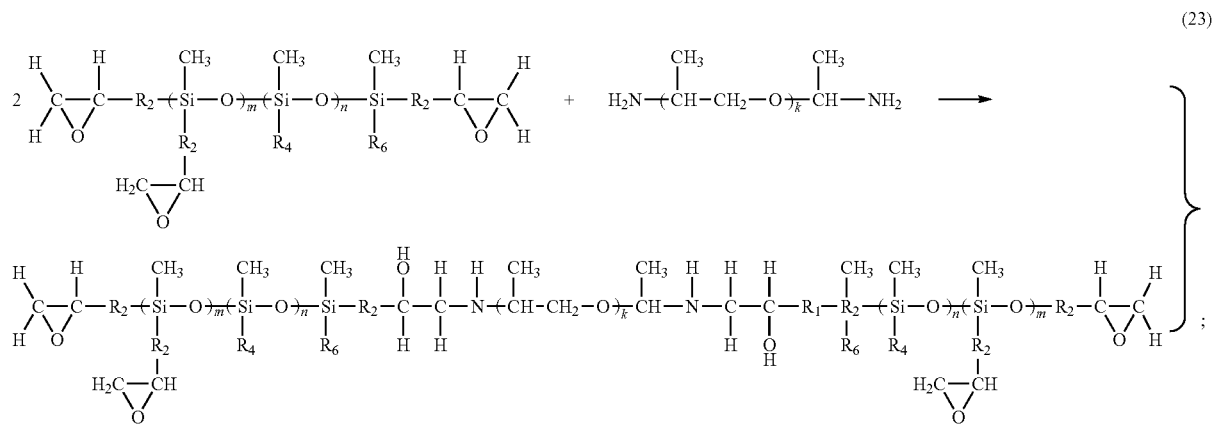
(23)

wherein the formula (24) is expressed as:

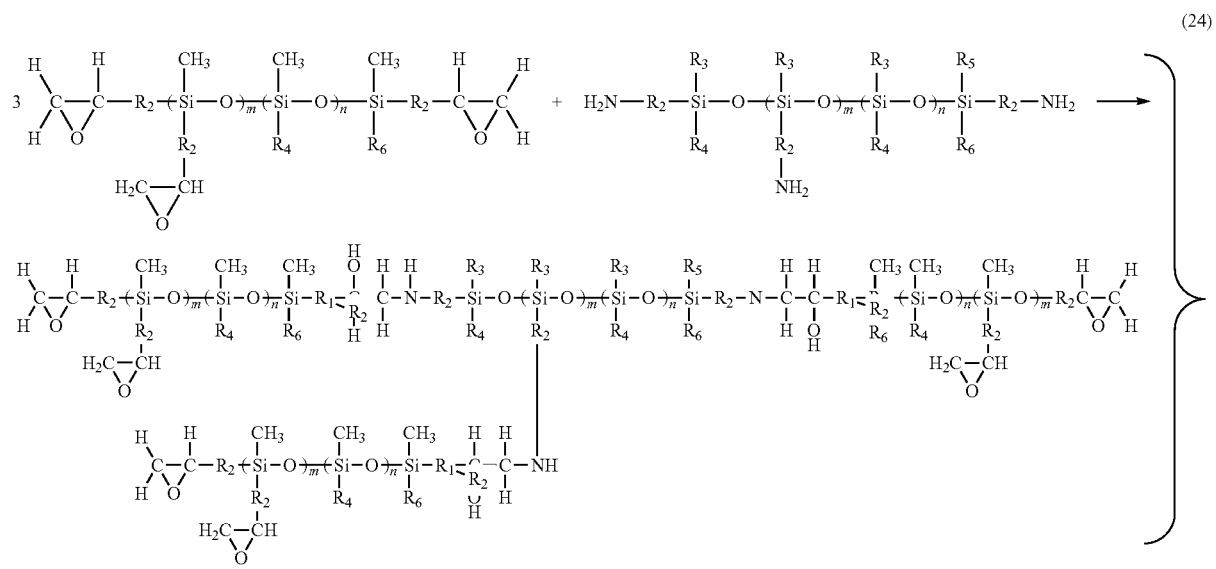
(24)

wherein the formula (25) is expressed as:

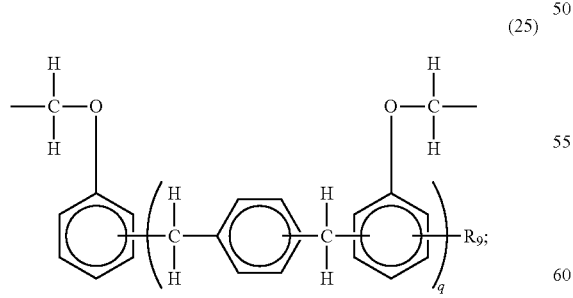
(25)

wherein in the formula (25), a number-average degree of polymerization q is 1-2; a number-average functionality of epoxy group is 2.0 or 3.0; and $R_9$ is selected from the group consisting of hydrogen, $C_1$-$C_5$ alkyl, unsubstituted phenyl, substituted phenyl, unsubstituted aryl, substituted aryl, unsubstituted heterocyclic group, substituted heterocyclic group and a combination thereof; and wherein the formula (26) is expressed as:

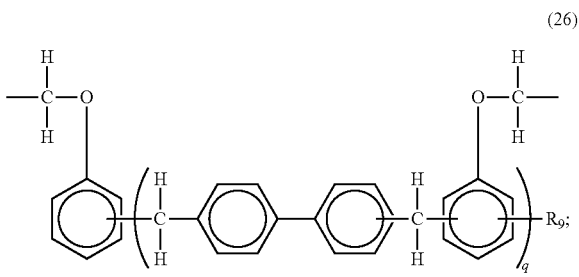
(26)

wherein in the formula (26), a number-average degree of polymerization q is 1-2; a number-average functionality of epoxy group is 2.0 or 3.0; and $R_9$ is selected from the group consisting of hydrogen, $C_1$-$C_5$ alkyl, unsubstituted phenyl, substituted phenyl, unsubstituted aryl, substituted aryl, unsubstituted heterocyclic group, substituted heterocyclic group and a combination thereof.

6. The thermally-conductive structural adhesive of claim 1, wherein the first coupling agent and the second coupling agent are independently selected from the group consisting of hexadecyltrimethoxysilane [CAS: 16415-12-6], hexadecyl triethoxysilane [CAS:16415-13-7], 3-glycidoxypropyltrimethoxysilane [CAS: 2530-83-8], 3-glycidoxypropyltriethoxy silane [CAS:2602-34-8], γ-aminopropyltrimethoxysilane [CAS: 13822-56-5], γ-aminopropyl triethoxysilane [CAS: 919-30-2], n-(β-aminoethyl)-γ-aminopropyltrimethoxysilane [CAS: 1760-24-3], n-(β-aminoethyl)-γ-aminopropyltriethoxysilane [CAS: 5089-72-5], γ-(methacryloyloxy)propyltrimethoxysilane [CAS: 2530-85-0], γ-(methacryloyloxy)propyltriethoxysilane [CAS: 21142-29-0], γ-pinyltriamino propylmethyldimethoxy silane [CAS:99740-64-4], isopropyldioleic (dioctylphosphate) titanate [CAS: 61417-49-0], isopropyl tri(dioctylphosphate) titanate [CAS: 65345-34-8], titanium triisostearoylisopropoxide [CAS: 61417-49-0], bis(P,P-bis-ethylhexyl diphosphato)ethanediolato titanate [CAS:65467-75-6], tetraisopropyl di(dioctylphosphate) titanate [CAS: 65460-52-8] and a combination thereof; and the first modifier and the second modifier are independently selected from the group consisting of: oleic acid [CAS: 112-80-1], lauric acid [CAS: 143-07-7], caprylic acid [CAS: 124-07-2], ricinoleic acid [CAS: 141-22-0], rosin acid [CAS: 514-10-3], salicylic acid [CAS: 69-72-7], benzoic acid [CAS: 65-85-0], dodecylbenzene sulfonic acid [CAS: 27176-87-0], benzotriazole [CAS: 95-14-7], methylbenzotriazole [CAS: 29385-43-1] and a combination thereof.

7. The thermally-conductive structural adhesive of claim 1, wherein the first curing accelerator and the second curing accelerator are independently selected from the group consisting of: phenol [CAS: 108-95-2], 2,4,6-tris(dimethylaminomethyl)phenol [CAS:90-72-2], triphenylphosphine [CAS:603-35-0], imidazole [CAS:288-32-4] and a combination thereof.

8. The thermally-conductive structural adhesive of claim 1, wherein the first thermally-conductive powder and the second thermally-conductive powder are independently selected from the group consisting of: aluminum oxide ($Al_2O_3$), magnesium oxide (MgO), silicon oxide ($SiO_2$), aluminum nitride (AlN), boron nitride (BN), zinc oxide (ZnO), silicon nitride ($Si_3N_4$), silicon carbide (SiC), boron carbide ($B_4C$) and a combination thereof;

the first thermally-conductive powder and the second thermally-conductive powder are independently spherical powder, flake powder, fibrous powder, irregular powder, hexagonal powder, cubic powder or a combination thereof; and with respect to the first thermally-conductive powder and the second thermally-conductive powder, an average particle size $D_{50}$ of single particle and an average particle size $D_{50}$ of agglomerated particle are 0.16-120 μm.

9. The thermally-conductive structural adhesive of claim 1, wherein the first flame retardant agent and the second flame retardant agent are independently selected from the group consisting of: aluminum hydroxide ($Al(OH)_3$), magnesium hydroxide ($Mg(OH)_2$), melamino cyanurate [CAS: 37640-57-6], ammonium polyphosphate (APP), aluminum hypophosphite ($Al(H_2PO_2)_3$), tricresyl phosphate [CAS: 1330-78-5], diethyl ethyl phosphate [CAS: 682-30-4] and a combination thereof; and with respect to the first flame retardant agent and the second flame retardant agent, an average particle size $D_{50}$ of single particle and an average particle size $D_{50}$ of agglomerated particle are 0.3-30 μm.

\* \* \* \* \*